United States Patent
Kerr et al.

(10) Patent No.: US 8,343,564 B2
(45) Date of Patent: Jan. 1, 2013

(54) BAKED POTATO PRODUCTS AND PROCESS FOR PREPARING SAME

(75) Inventors: John C. Kerr, Pocatello, ID (US); Sylvester L. Woodland, Blackfoot, ID (US); Roman J. Bogdanowicz, Blackfoot, ID (US); Pajaree T. Lynn, Pocatello, ID (US)

(73) Assignee: Nonpareil Corporation, Blackfoot, ID (US)

( * ) Notice: Subject to any disclaimer, the term of this patent is extended or adjusted under 35 U.S.C. 154(b) by 618 days.

(21) Appl. No.: 12/115,839

(22) Filed: May 6, 2008

(65) Prior Publication Data

US 2009/0047412 A1    Feb. 19, 2009

Related U.S. Application Data

(60) Provisional application No. 60/916,328, filed on May 7, 2007, provisional application No. 61/030,257, filed on Feb. 21, 2008.

(51) Int. Cl.
    *A23L 1/216* (2006.01)

(52) U.S. Cl. ......... 426/637; 426/615; 426/390; 426/416

(58) Field of Classification Search .................... 426/637
    See application file for complete search history.

(56) References Cited

U.S. PATENT DOCUMENTS

| | | | | |
|---|---|---|---|---|
| 1,238,893 A * | 9/1917 | Dahieen | ........................ | 83/118 |
| 1,402,108 A * | 1/1922 | Stoddard et al. | ............. | 426/143 |
| 3,493,390 A * | 2/1970 | Succo | ........................... | 426/272 |
| 3,729,323 A * | 4/1973 | Nonaka | ......................... | 426/441 |
| 4,167,588 A * | 9/1979 | Willard | ........................ | 426/283 |
| 6,180,145 B1 * | 1/2001 | Ricks | ........................... | 426/243 |
| 6,599,547 B1 * | 7/2003 | Martinez-Serna Villagran et al. | ........................... | 426/242 |

OTHER PUBLICATIONS

Duckham: Effect of Cultivar and Storage Time on the Volitale Flavor Components of Baked Potato; Jrnl. Agrc, and Food Chem. 2002, 50, 5640-5648.*

White: Ascorbic Acid and Moisture Content of Potatoes Baked by Forced Air and Microwave Methods, Chilled Stored, and Microwave Reheated; Thesis, University of Tennessee, Jun. 1983.*

(Continued)

*Primary Examiner* — Humera Sheikh
*Assistant Examiner* — Patricia George
(74) *Attorney, Agent, or Firm* — Thaddius J. Carvis

(57) ABSTRACT

The invention relates to baked potatoes and, particularly, to convenient forms of baked potatoes having an optimally-baked flavor and texture which can be simply prepared for serving in any size portion with a minimum of effort. In one preferred form, the product will be in the form of baked potato pieces with the skin attached, preferably having a moisture content of from about 70 to about 75% and flavor and texture profiles characteristic of optimally baked potatoes. A process and an apparatus for preparing the potatoes and a packaged form are also provided. The process calls for freezing a baked potato and subdividing the potato into discrete pieces of a size of from about 0.5 to about 1.5 inches, preferably by means comprising at least one roller pair comprising a plurality of rotatably mounted blades with cutting edges angularly offset (FIG. 7) or diagonally-opposed, spaced cutting blades (FIG. 7).

9 Claims, 15 Drawing Sheets

OTHER PUBLICATIONS

Duckham: Effect of Cultivar and Storage Time on the Volatile Flavor Components of Baked Potato; Jrnl. Agrc, and Food Chem. 2002, 50, 5640-5648.*

Hartman, T.G. et al "Flavor Characterization Using Adsorbent Trapping-Thermal Desorption or Direct Therman Desorption-Gas Chromatography and Gas Chromatography-Mass Spectrometry", in Flavor Measurement, Ho & Manley editors, Marcel Dekker, Inc. NY, 1993.

Salinas, J.P., Hartman, T.G., "Lipid-Derived Aroma Compounds in Cooked Potatoes and Reconstituted Dehydrated Potato Granules", in Lipids in Food Flavors, Ho & Hartman editors, American Chemical Society, Washington DC, 1994.

Mottram, D.C., "Flavor Compounds Formed during the Maillard Reaction". Thermally Generated Flavors, Parliament, Morello and McGorrin, editors, American Chemical Society, Washington DC, 1992.

Dietary Guidelines for Americans, 2005.

The Surgeon General's Report on Nutrition and Health, Washington DC: US Dept. of Health and Human Services: 1988. and DHHS (PHS) publication No. 8-50210.

* cited by examiner (Graph 3-1)

(Graph 4-1)

Measurements of Peak Load, Deformation at Peak Load
and Work Done to Hardness

(Graph 4-2)
Peak Load comparison of 20 Potatoes
(Before and after Rehydration)

(Graph 4-3)
Deformation at Peak Load Comparison of 20 Potatoes
(Without and with Rehydration)

(Graph 4-4)

Work Done to Hardness Comparison of 20 Potatoes
Without and With Rehydration (Graph 6-1)

Iodine Index Comparison of Raw Potatoes and Potatoes
Baked to 75.7%, 72.0%, and 66.0% Moisture (Graph 6-2)

Average Iodine Index of Raw Potatoes and Potatoes
Baked to 75.7, 72.0, and 66.0% Moisture

BAKED POTATO PRODUCTS AND PROCESS FOR PREPARING SAME

CROSS REFERENCE TO RELATED APPLICATIONS

This application claims the benefit of two provisional applications, namely U.S. patent application No. 60/916,328, filed May 7, 2007 and U.S. Patent Application No. 61/030,257, filed Feb. 21, 2008.

BACKGROUND OF THE INVENTION

The invention relates to baked potatoes and, particularly, to optimally baked potatoes, especially in a convenient form of baked potatoes having a fully-baked flavor and texture which can be simply prepared for serving in any size portion with a minimum of effort. Processes and apparatus for preparing the potatoes and packaged forms are also provided.

Potatoes have been a staple in the diets of many cultures and are currently taking on favor with regard to frequent recommendations to eat foods high in fiber and complex carbohydrates. See, the Dietary Guidelines for Americans, 2005, released Jan. 12, 2005, by HHS and USDA. These Guidelines point out that "major causes of morbidity and mortality in the United States are related to poor diet and a sedentary lifestyle." This is in accord with The Surgeon General's Report on Nutrition and Health. Washington, D.C.: US Dept of Health and Human Services; 1988 and DHHS (PHS) publication No. 88-50210. The Surgeon General's report states, "For two out of three adult Americans who do not smoke and do not drink excessively, one personal choice seems to influence long-term health prospects more than any other: what we eat." (p1) The report goes on to point out that the type and amount of foods are implicated in general health.

Potatoes are the most widely grown tuber crop in the world. Potatoes are native to Peru, where they were first cultivated by the Incas; and they remain an important to the culture of the Andes, where a wide variety is grown with a diversity of colors and shapes. They were then introduced to Europe and the rest of the world by returning Europeans. Potatoes now available in North America include many varieties developed there and in Europe. They are important nutritionally and are consumed in large quantities due to their eating qualities.

Nutritionally, potatoes are best known for their carbohydrate content (approximately 26 grams in a medium potato). Starch is the predominant form of carbohydrate found in potatoes. A small but significant portion of the starch in potatoes is resistant to enzymatic digestion in the stomach and small intestine and reaches the large intestine essentially intact. This resistant starch is considered to have similar physiological effects and health benefits of fiber.

From a consumer standpoint, potatoes are often grouped into two broad categories—boiling potatoes and baking potatoes. This is not a technical distinction, but a traditional one, with the principal difference between the two types being that boiling potatoes hold up better to liquids because of the amount and nature of starch they contain. Baking potatoes are relatively high in a starch called amylose. Boiling potatoes have less amylose and contain more amylopectin, a type of starch that holds the potato together when boiling or in soup and stews. Amylose is a linear polymer of glucose linked with mainly $\alpha$ (1→4) bonds. Amylopectin is a highly branched polymer of glucose linked in a linear way with $\alpha$ (1→4) bonds while branching takes place with $\alpha$ (1→6) bonds occurring every 24 to 30 glucose units. The degree of cooking of a particular type of potato can be judged by a number of factors, including the association of the types of starch and their degree of crystallinity.

Boiling potatoes are considered by many as waxy potatoes, due to their high amylopectin contents. They come in a variety of shapes and can be long or round. They typically have a thin, smooth skin and an almost waxy flesh or pulp. They are relatively high in moisture and sugar, but low in starch. This type of potato can be mashed but the results tend to be thicker and lumpier than achieved for baking potatoes. Often thought of as being boiling varieties are those sold as round white, round red, yellow potato, red potato, salad potato, la soda, red la rouge, red Pontiac, red nordland, red bliss, yellow Finnish, ruby crescent, and Australian crescent.

Baking potatoes are often thought of as starchy due to their different starch makeup and the way they respond to baking. In appearance, they tend to be long and have a coarse, cork-like skin. They are high in amylose starch, with a dry, mealy texture. But, the pulp turns light and fluffy when cooked. Russets are generally preferred and are typically known as Russet Norkotah, Russet Burbank, Russet Arcadia, Norgold Russet, Russet Goldrush, Long White (or White Rose or California Long White), and Idaho (which is loosely used to describe Russets).

As noted the distinction between baking and boiling potatoes is traditional, but both types can be baked to provide a combination of a complex flavor development and skin and pulp texture. When optimally baked, potatoes are an irresistible food to some. The optimally-baked potato offers a combination of flavor, texture and mouthfeel that, while highly desired, is often missed due to the time and care involved in preparation. Even the aroma that fills the room when baked potatoes are reaching the most desired degree of baking is thought by many to be irresistible but is not always achieved. There has not, heretofore, been a way to capture all of the pleasures of a baked potato without the long baking times.

The optimally baked potato will have its moisture reduced from about 78 to 81% as the norm for a raw Russet potato to about 72%. The optimally baked potato will have a flavor and aroma based on compounds generated, principally by the Maillard reaction, during the baking. Additionally, it will have a dry, fluffy, mealy texture that still offers resistance to the bite but then quickly becomes smooth like mashed potatoes in the mouth. During baking, the peel (also sometimes referred to as a skin) is dried along with a layer of directly underlying pulp (e.g., extending up to 5 mm, but generally from 1 to 3 mm). This drying is necessary to the optimum flavor development and adds a desirable texture to the final product. However, in some cases the peel and the underlying pulp can form a tough exterior that is not fully desirable to some when eaten.

Baked potatoes should not be under cooked (e.g., moisture reduced to only about 76%) where the resistance to bite is excessive and the flavors are not fully developed. And, they should not be over baked to the point (e.g., to about 66% and below) that they are too dry and or have a burnt flavor or aroma. Excessive moisture reduction is evidenced by decreased textural quality and undesirable flavor development. The textural properties of an optimally baked potato can be measured by textural methods.

The baking process also ruptures cell walls holding the starch, which is initially a crystalline complex of amylose and amylopectin, and makes the amylose readily extractable. Thus, tests showing the degree of amylose extraction, like a simple Iodine Index, can be used as an objective test to gauge the degree of baking and thus help identify an optimally baked potato.

To date it has not been possible to provide the eating advantages of an optimally baked potato in a convenient form useful for home or institutional reheating. When optimally baked, there can be problems with skin texture. When baked and left whole, there can be problems of portion control and packaging. Also, when fully baked, frozen and reheated, there can be problems with diminished textural appeal of the peel and/or pulp. When less than fully baked, there is a significant loss in eating quality due to a lack of flavor and texture. When fully baked and mashed, there is a loss of texture.

There remains a current need for improvements that would permit the enjoyment of a properly baked potato with simple and minimal effort for preparation for consumption.

BRIEF DESCRIPTION OF THE INVENTION

The invention addresses the need for products, processes and products that would permit the enjoyment of a properly baked potato with simple and minimal effort for preparation for consumption.

It is an object of the invention to provide improvements in baked potatoes providing enhanced consumer convenience.

It is an object of a preferred aspect of the invention to provide processing, apparatus and product improvements in baked potatoes.

It is another object of several preferred aspects of the invention to provide processing, apparatus and product improvements in baked potatoes that permit the enjoyment of an optimally baked potato with simple and minimal effort for preparation.

It is yet another object of preferred aspects of the invention to provide processing, apparatus and product improvements in baked potatoes that enable easy home and institutional preparation of an optimally-baked potato in terms of taste and texture.

It is yet another object of preferred aspects of the invention to provide processing, apparatus and product improvements in baked potatoes that provide the eating pleasure of baked potato with good taste and a pleasing texture of both skin and potato pulp with minimal trouble for preparation.

It is yet another object of preferred aspects of the invention to provide processing, apparatus and product improvements in baked potatoes that enable enjoyment of baked potatoes having good taste and texture which can be packaged with various toppings, some of which have been considered incompatible with a properly baked potato prepared for reheating.

These and other objects are achieved by the invention, in at least its preferred aspects, which provides improved baked potato processing, apparatus and products.

In one aspect, the invention provides a frozen baked potato which meets criteria for flavor and texture associated with an optimally-baked potato.

In another aspect, the invention provides a baked potato product, comprising: discrete pieces of frozen baked potato including the peel, preferably wherein the peel has been rehydrated following baking.

In a further aspect, the invention provides an apparatus for preparing a baked potato product, the apparatus comprising: means for baking a potato to a moisture content of from 70 to 75 percent; means for freezing the potato; means for subdividing the potato into discrete pieces, e.g., of a size of from about 0.5 to about 1.5 inches, by means comprising at least one roller pair comprising a plurality of rotatably mounted blades with cutting edges angularly offset or diagonally-opposed, spaced cutting blades; and means for freezing the discrete pieces of potato product.

In yet another aspect, the invention provides a process for preparing a baked potato product, the process comprising: baking a potato to a moisture content of from 70 to 75 percent; freezing the potato; subdividing the potato into discrete pieces; packaging the discrete pieces of potato product under frozen conditions to maintain a flowable characteristic.

Many preferred features of the invention will be described below.

BRIEF DESCRIPTION OF THE DRAWINGS

The invention will be better understood and its advantages will become more apparent when the following detailed description is read in light of the accompanying drawings, wherein:

FIG. 16A, Graph 4-1, graphs Measurements of Peak Load, Deformation at Peak Load and Work Done to Hardness according to Example 3.

FIG. 16 C, Graph 4-3, shows Deformation at Peak Load Comparison of 20 Potatoes (Without and with Rehydration) according to Example 4.

FIG. 16 D, Graph 4-4, depicts "Work Done to Hardness" Comparison of 20 Potatoes Without and With Rehydration according to Example 4.

FIG. 17 B, Graph 6-2, graphs data on Average Iodine Index of Raw Potatoes and Potatoes Baked to 75.7, 72.0, and 66.0% Moisture according to Example 6.

DETAILED DESCRIPTION OF THE INVENTION

Figure 1:
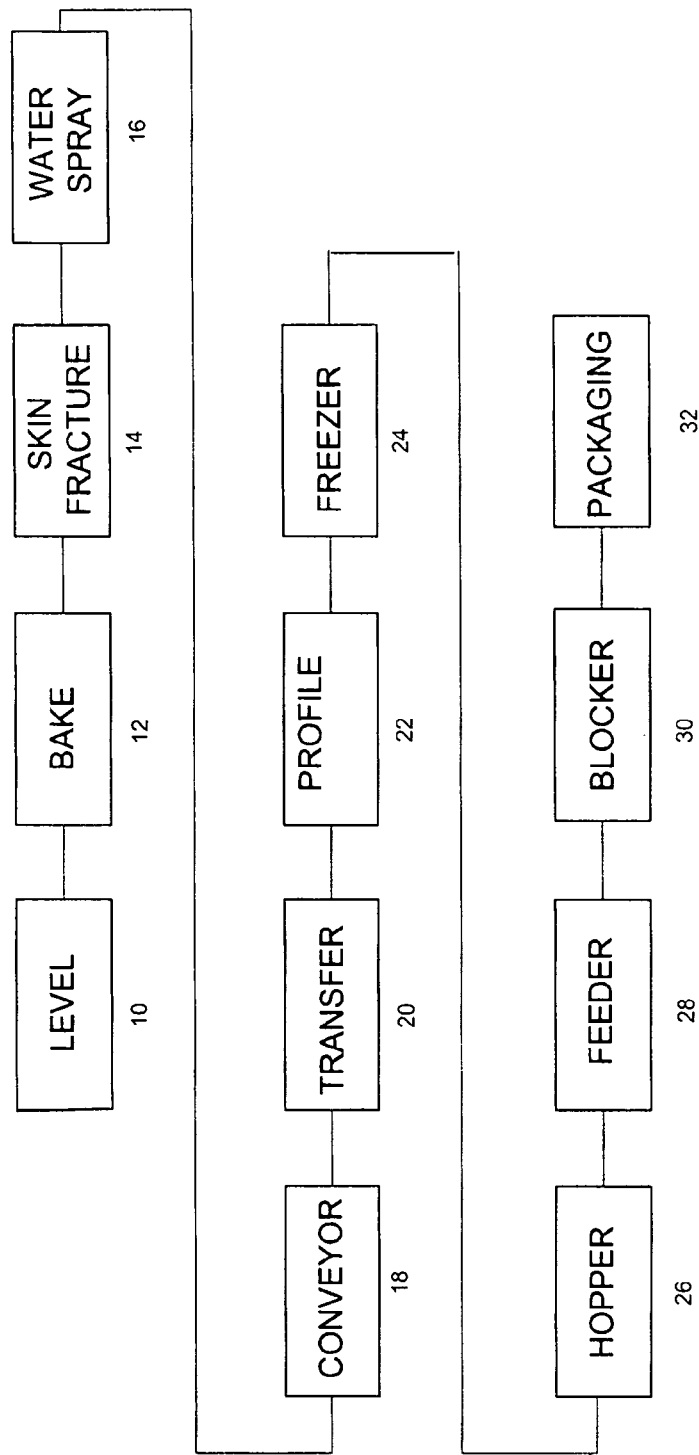
FIG. 1 is a flow diagram of one process for preparing a product according to the invention.

The invention relates to baked potatoes and to processes and apparatus for their production. The products in their preferred forms have the taste and texture of baked potatoes properly prepared in terms of taste and texture. When so prepared, with these characteristics as objectively defined herein, the products provide the consumer with the eating quality of home-baked potatoes optimally with a minimum amount of preparation. In the most preferred forms, the products of the invention have a desirable baked potato texture, both of the peel and the pulp, and flavor, and give off a baked potato aroma when prepared for serving by microwave heating. In all forms, the products of the invention provide convenience and simplicity.

As will be further explained and detailed below, the process of baking potatoes causes a variety of changes in potatoes. These changes are necessary to provide the taste that consumers expect from a baked potato. Experts in potato technology and tasting can identify an optimally baked potato by texture and aroma, and such data obtained from such panels is generally highly reproducible. We note that commercial equipment is capable of preparing perfectly baked potatoes at near the upper part of the range of from about 70 to about 75%. The term "optimally baked potato" as used herein will be defined as a baked potato having fully developed flavor and texture identified by expert tasters using as a standard of comparison a 6 ounce Russet Norkotah potato baked (starting moisture of from about 78 to about 81%) to a moisture content of about 72%, with comparisons to over-baked potatoes of the same variety baked to about 66% moisture and under-baked potatoes of the same variety baked to about 76% moisture.

The expert panel will be able to identify optimally baked potato as having a flavor and aroma based on compounds generated, principally by the Maillard reaction, during the baking. Additionally, the expert panel will be able to identify the optimally baked potato by its characteristic dry, fluffy, mealy texture that offers resistance to the bite but then quickly becomes smooth like mashed potatoes in the mouth. During baking, the peel (also sometimes referred to as a skin) is dried along with a layer of directly underlying pulp (e.g., extending up to 5 mm, but generally from 1 to 3 mm). This drying is necessary to the optimum flavor development and adds a desirable texture to the final product. However, in some cases the peel and the underlying pulp can form a tough exterior that is not fully desirable to some when eaten.

The optimally baked potato can also be identified by objective tests of the type indicated in the examples below, which quantify textural and flavor parameters. The following objective criteria will be based on tests as detailed in the examples.

The potato pulp of an optimally baked potato will typically exhibit the following characteristics:

Average rigidity of from about 85 to about 105, e.g., from about 80 to about 110, grams, where rigidity is measured as described in Example 3, below.

Average mean load of from about 75 to about 110, e.g., from about 80 to about 105, where mean load is measured as described in Example 3, below.

The potato peel of an optimally baked potato will typically exhibit the following characteristics:

Average peak load without rehydration of from about 800 to about 1500, e.g., about 900 to 1300 grams, where peak load is measured as described in Example 4, below.

Average peak load with rehydration of from about 500 to about 750, e.g., from about 550 to about 700 grams, where peak load is measured as described in Example 4, below.

Average deformation at peak load without rehydration of from about 12.5 to about 17.5, e.g., from about 13 to about 17, grams, where deformation at peak load is measured as described in Example 4, below.

Average deformation at peak load with rehydration of from about 6.0 to about 9.0, e.g., from about 13 to about 17, grams where deformation at peak load is measured as described in Example 4, below.

Average work done to hardness without rehydration of from about 2700 to about 5600, e.g., from about 3000 to about 5000, grams, where work done to hardness is measured as described in Example 4, below.

Average work done to hardness with rehydration of from about 1600 to about 2600, e.g., from about 1700 to about 2500 grams, where work done to hardness is measured as described in Example 4, below.

The flavor of an optimally baked potato will typically exhibit the following characteristics:

Total Strecker Aldehydes of from about 2000 to about 10,000, e.g., from about 4000 to about 8000, nanograms (ng), as measured according to Example 5, below.

Total Pyrazines of from about 1000 to about 10,000, e.g., from about 2000 to about 5000, nanograms (ng), as measured according to Example 5, below.

The starch in the pulp of an optimally baked potato will typically exhibit the following characteristic:

Iodine Index of from about 0.2 to about 0.4, e.g., form about 0.235 to about 0.335, as measured according to Example 6, below.

Additionally, an optimally baked potato will typically exhibit the following characteristic:

Moisture content of from about 70 to about 74%, e.g., from about 71 to about 73%, preferably about 72%.

The invention is not known to be limited to potatoes of any particular variety, but is illustrated herein throughout as using typical Russet baking potatoes, e.g., Russet Norkotah. The invention will be applicable to potatoes of other varieties, including some commonly associated with boiling. The tests indicated in the examples will yield numerical values for the other varieties for the objective criteria measured generally proportional to those of the tests herein. For example, the contrast between optimally baked and under-baked and over-baked potatoes will be at about the same ratios as indicated in the examples, but the absolute numbers will differ with the varieties.

Figure 2:
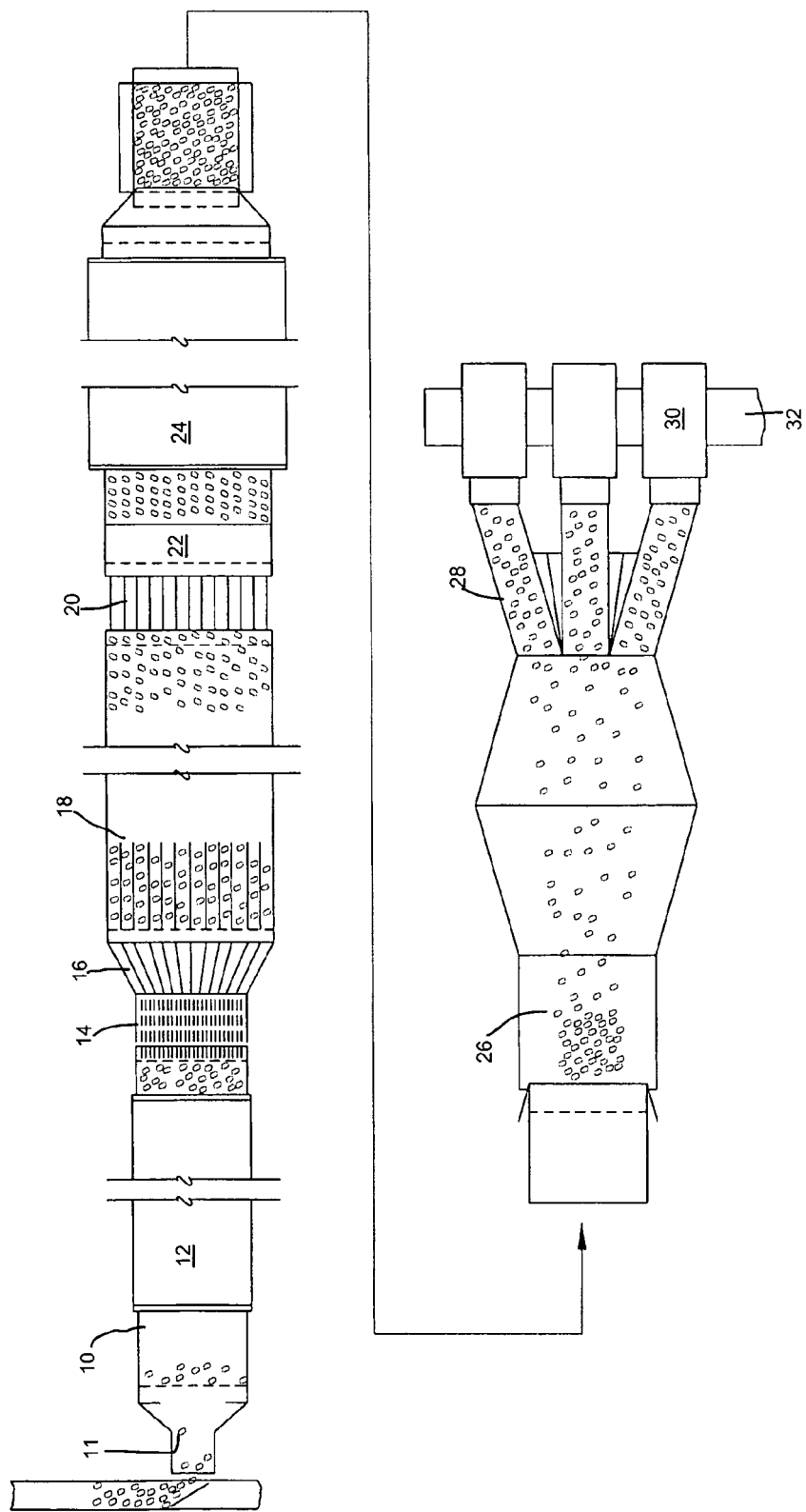
FIG. 2 is a schematic top plan view of a process as illustrated in FIG. 1.

Reference to FIG. 1 shows a flow diagram of one process for preparing a product according to the invention, which is illustrated further in FIG. 2 as a schematic top plan view. These drawings illustrate a preferred arrangement for preparing potato products according to the invention, from start to finish. Incoming potatoes are scrubbed at a station in conventional manner (not illustrated), as may be accomplished before or after inspection. Scrubbing can entail scrubbing with brush rolls (not shown) in conjunction with water spray being tumbled as they are fed by gravity. They are then conveyed onto a belt, e.g., of mesh or stainless steel sheet, where they are leveled 10 for passing though an oven 12 for baking.

The potatoes (shown as 11 in FIG. 3) are baked until done to a degree where the baked potato flavor is well developed and the texture has a degree of resistance to the bite but quickly reaches a smooth texture in the mouth upon chewing. These criteria are generally well recognized by those skilled in the art, but can also be described in terms of the objective test methods described below. The typical baking will reduce the moisture content of a Russet Norkotah potato from a typical range of about 78 to about 81% to within the range of from about 70 to about 75%, e.g., from about 70 to about 74%, say about 72%, which for this variety is typical of a perfectly baked potato. Other varieties will vary proportionally based on their raw and baked moistures. Oven conditions can be varied depending on the size and moisture of the potatoes processed, but temperatures of from about 300° to about 450° F., e.g., about 400° to 425° F., and times of about 45 minutes to about 90 minutes, e.g., about 50 to about 75 minutes, are effective for average-sized Russet Norkotah potatoes weighing about 6 ounces. The person skilled in the art will be aware of relations between times and temperatures to achieve the optimum baked potato for a given oven.

The baked potatoes, without further treatment, would have a very good flavor and texture for the pulp portion, but the skins would tend to be a bit too tough following baking. To prepare products that have a desirable skin as well as a good pulp texture, which can be prepared for consumption by microwave heating or other rapid heating, the baked potatoes are specially treated according to one aspect of the invention. Tests have indicated that rehydrating the skin can reverse the tough skin problem. It has been further found that rehydrating the potato skin can be facilitated by puncturing the skin to permit water to enter underneath the skin. To accomplish this in the apparatus illustrated in the drawings, the potatoes are conveyed from the oven 12 to a skin fracturing mechanism 14, here shown to include a chute 140 with guides 142 leading to four banks of rotating elliptical blades 144, which can be sharpened or unsharpened as the need presents itself for a particular apparatus and potato combination.

The blades 144 can rotate, e.g., clockwise to alternately lift and drop the potatoes 11 onto a successive bank of blades. The blades 144 are spaced appropriately to slit the potatoes effectively for rapid and complete hydration (e.g., half inch slits every inch and a half transverse to the direction of movement of the potatoes and spaced 1½ inches in the direction of movement). This fracturing step of the potato skin is highly advantageous to achieve uniform, rapid hydration in less time and with less water than without it. Hydration can improve skin texture over what it would be without the hydration, but may be optional based on consumer preferences. While the fracturing is effective, simply giving the potatoes more time in contact with the water can achieve a suitable result. Other means, such as dockering pins, transversely-rotating knives, guillotine-type cutters, lasers, rollers with projections, belts with large abrasive elements and the like, can be employed to achieve the fracturing. Alternative means for hydration can include dipping in a bath, a non-singulating chute or conveyor with a sheet of water flowing concurrently or counter currently with the potatoes.

Figure 3:
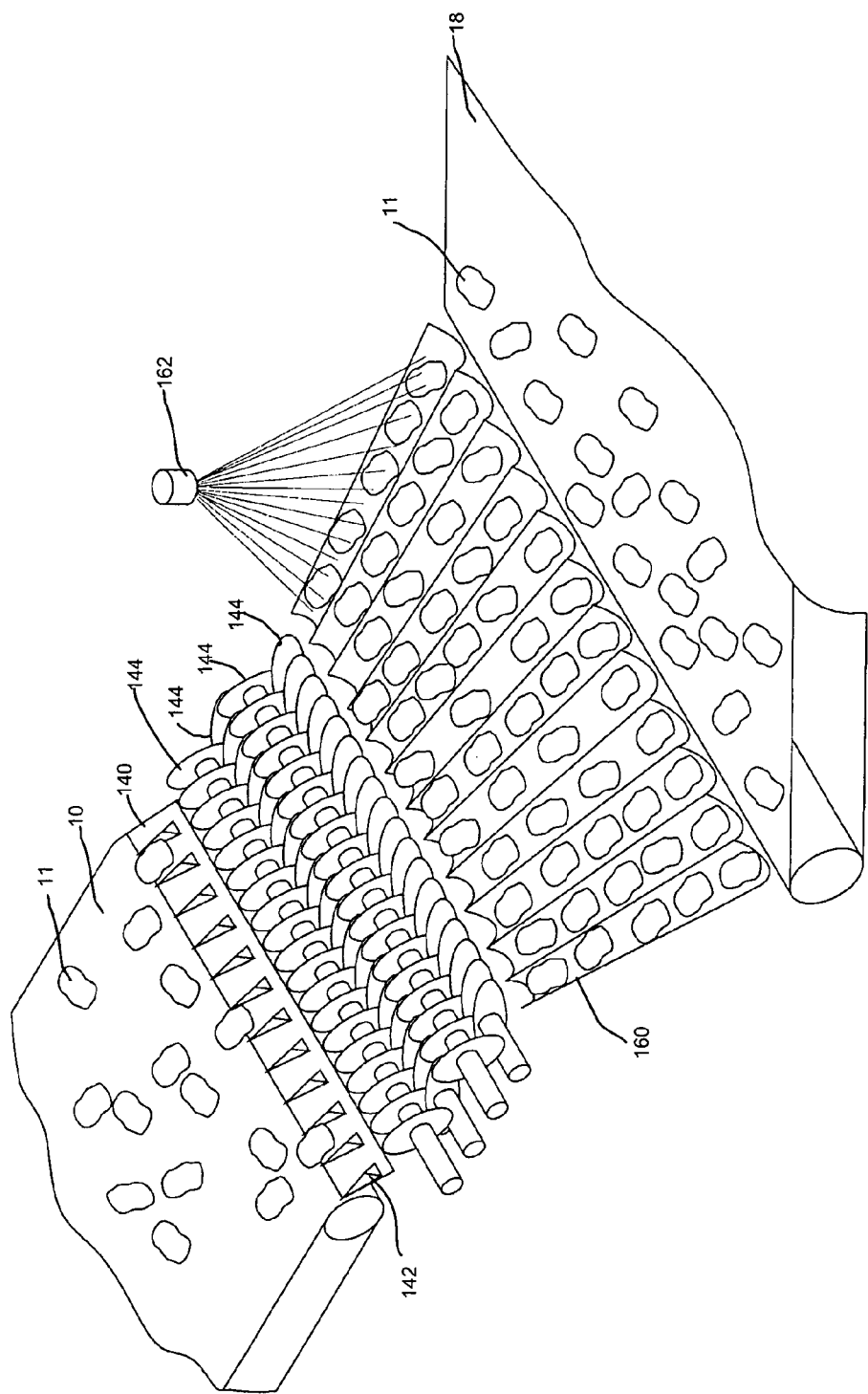
FIG. 3 is a schematic perspective view of illustrative equipment of the baking, skin fracture and water spray steps identified in FIG. 2.
Figure 4:
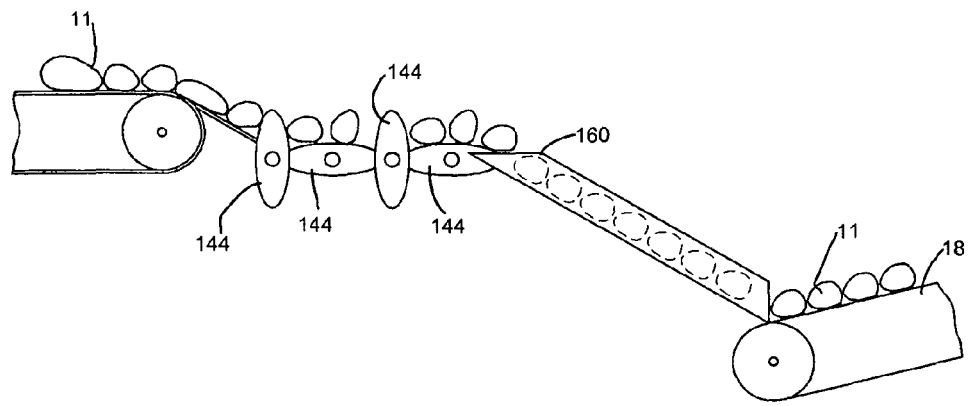
FIG. 4 is a schematic side elevation of the equipment shown in FIG. 3.

The potatoes 11 are shown in FIG. 3, as preferred, singulated as they pass through conforming channels 160 and are sprayed with water from nozzles 162 positioned, preferably over each channel, to achieve uniform wetting of the potatoes 11. The breaking of the potato skin and the water spray with use of the channels 160 permits hydration to occur more rapidly and with less water. FIG. 4 is a schematic side elevation of the equipment shown in FIG. 3 and shows the conveyor 10 from the oven 12 bringing potatoes to the chute 140 and then to the blades 144 where a plurality of breaks both along the width and length of the potatoes is achieved. Other arrangements can be employed to achieve the desired uniform hydration. The potatoes tend to flip end over end during movement by the blades 144 and results in providing slits around all sides of the potatoes.

From the water sprays and the chutes 160, the potatoes are conveyed such as by belt 18 which is moved at a rate effective to provide equilibration with the added moisture. If desired, the conveyor can lead to an accumulating area where the potatoes are held with little or no movement. The amount of moisture will typically increase the moisture content by from about 1 to about 3 percent, in the preferred case bringing the moisture content of the potatoes up from an optimum of about 72% by weight to about 73 to 75%, e.g., about 74%. Hold times on the belt will typically range from less than about 1 minute to about 3 minutes, and will typically be from about 2 to about 2.5 minutes.

Figure 6:
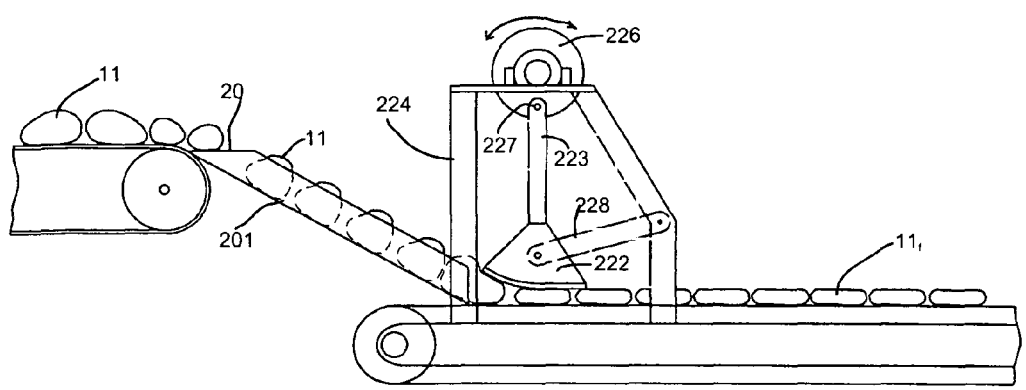
FIG. 6 is a schematic side elevation of the of the conveying and profiling equipment shown in FIG. 5.
Figure 5:
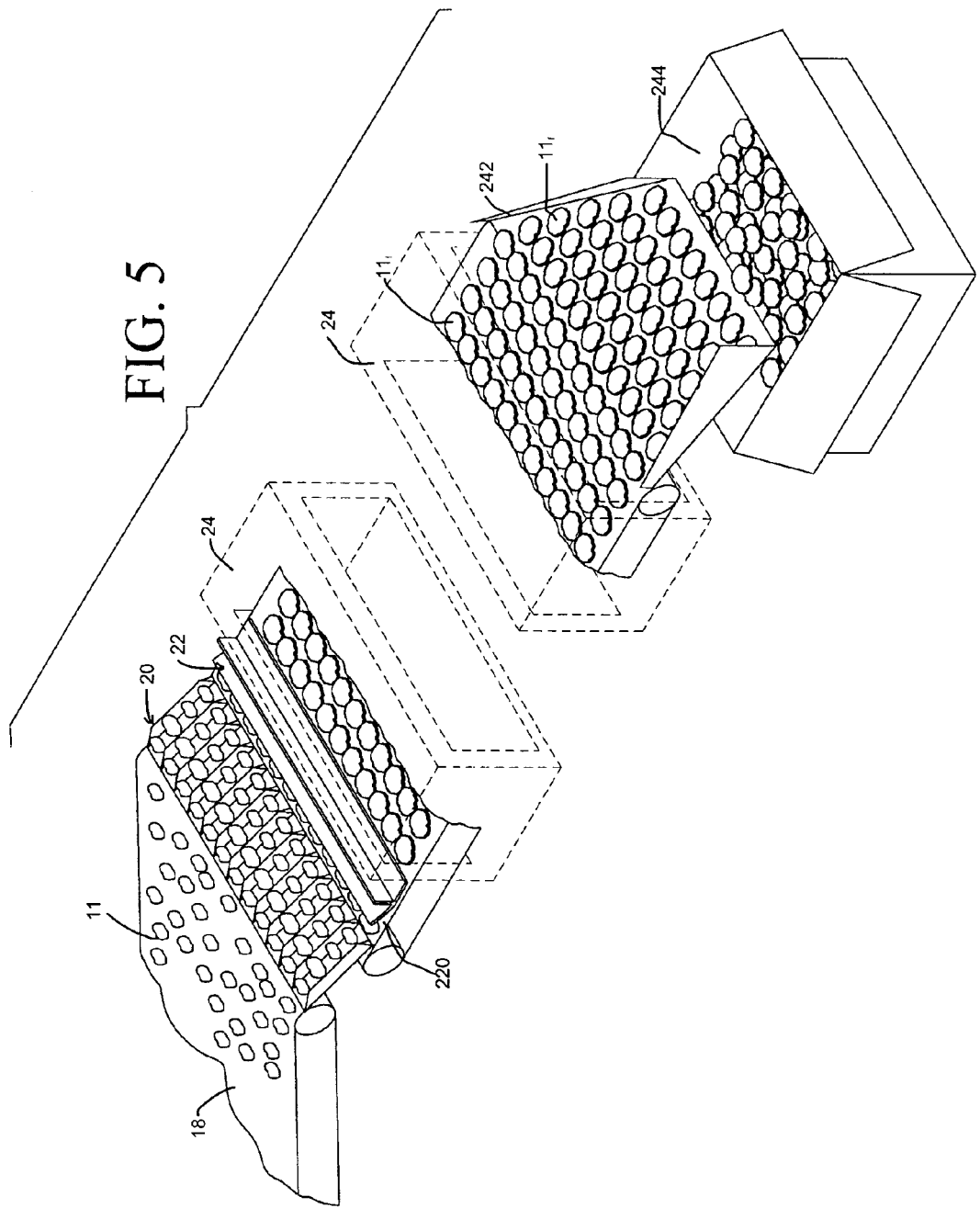
FIG. 5 is a schematic perspective view of illustrative equipment of the conveying, profiling and freezing steps identified in FIG. 2.

Referring now to FIG. 5, which is a schematic perspective view of illustrative equipment of the conveying, profiling and freezing steps referenced in FIG. 2, there are seen baked, moisture-equilibrated potatoes being conveyed on belt 18 down feeder chutes 201 to belt 220. The feeder to belt 220 preferably feeds the individual potatoes down the chutes which are formed by spaced guide walls 201 to assure proper operation of the next process operation of profiling (pressing uniformly to a desired thickness) the potatoes at 22 for subsequent subdividing, e.g., breaking, into bite-sized pieces. This step should be performed, such as with equipment as shown, to facilitate the later subdivision without mashing the pulp. Desirably, the potato will fracture but retain a desirable baked potato texture. In some preferred product forms, the thickness will be about three quarters of an inch. Other thicknesses, e.g., from about ¼ to about 1½ inches can be easily employed if other sized pieces are desired for a particular product application or customer. FIG. 6 shows a device 222, which is illustrated as a long shoe and can be pressed against the potatoes as they are conveyed under it.

FIG. 6 illustrates a preferred apparatus arrangement to manipulate the shoe 222 to let it move in an arcing path to uniformly press the potatoes and they pass underneath it on a continuously moving conveyor 220. The pressing device 22 is shown to include a frame 224 holding a pivotable wheel 226, which rotates about 180° back and forth as illustrated by the arrow. A link pin 227 on the wheel 226 holds an elongated extension 223 of the shoe to move it up and down with the movement of the wheel 226. Also, a guide 228 is provided to limit the movement of the shoe in the line of movement of the potatoes 11 on the conveyor 220. Where desired, the mechanism for moving a shoe or other press device may be employed. In some embodiments it is contemplated to use converging conveyor belts or rollers such as can be used for flattening dough sheets.

From the profiling station 20, the flattened potatoes $11_f$ are moved via conveyor 220 or different conveyor to a freezer 24. FIG. 5 shows the flattened potato pieces $11_f$ being conveyed to a chute 242 to boxes 244. The flattened potatoes $11_f$ are frozen in any suitable commercial freezer 24. The potatoes exiting freezer 24 should be frozen to a degree that they are firm enough for further processing or at least sufficiently firm to be accumulated in boxes, baskets, bins or the like for holding at freezer temperatures until needed for further processing. The flattened potatoes $11_f$ will be frozen at least partially in freezer 24, but they need not be fully frozen at this point. It is, however, important that the potatoes $11_f$ maintain their flattened shapes with little or no bending or the like that would impair feeding of the potatoes $11_f$ into equipment for breaking or cutting them into the desired sized pieces. Storage in boxes or other containers can add flexibility to the process.

Figure 7:
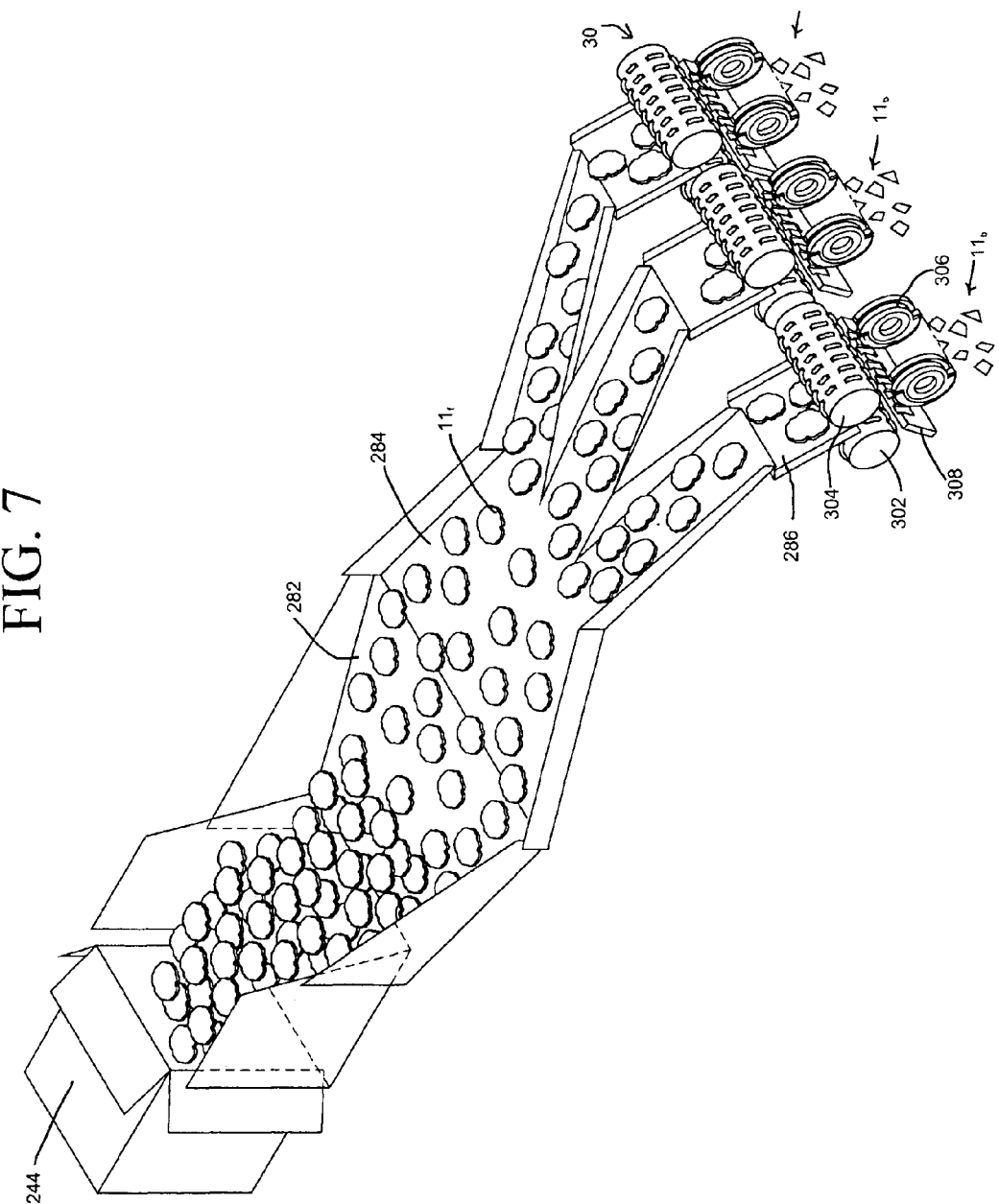
FIG. 7 is a schematic perspective view of hopper, feeder and blocker equipment as identified in FIG. 2.
Figure 8A:
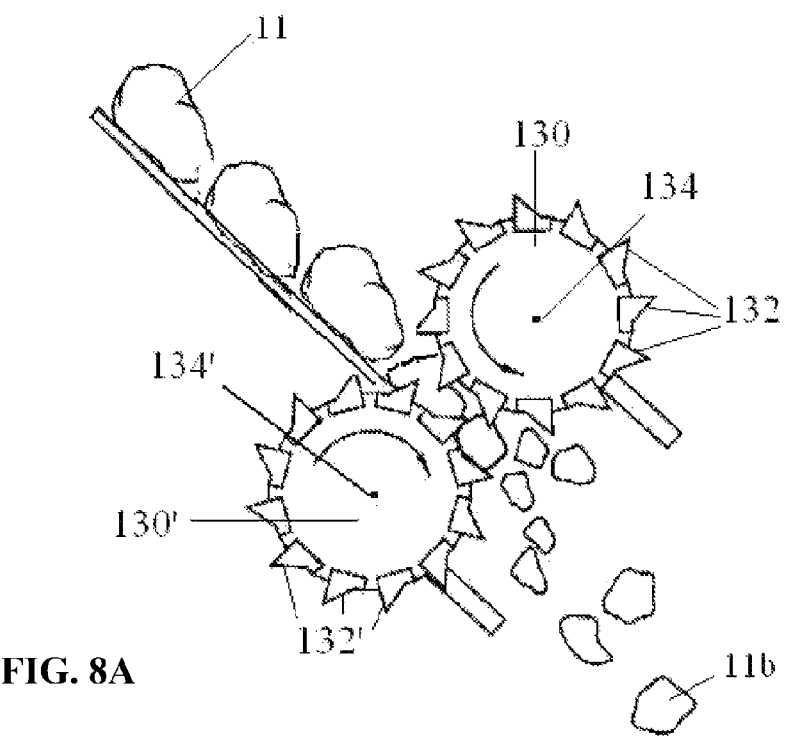
FIG. 8A is a schematic side elevation of shown in FIG. 7A for breaking whole frozen potatoes into pieces.
Figure 8:
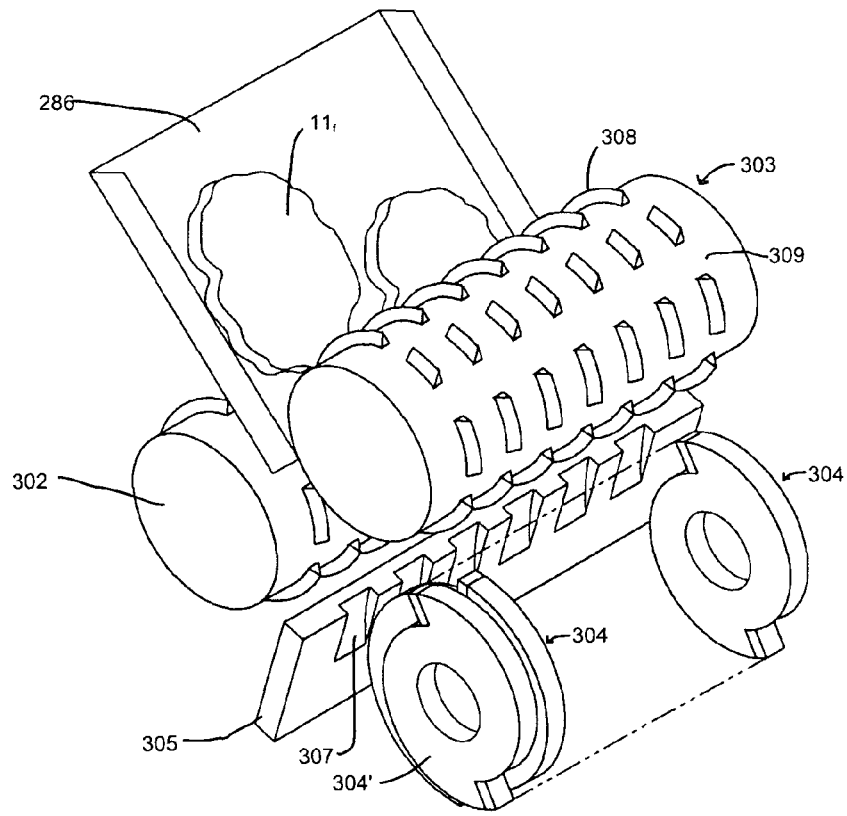
FIG. 8 is a schematic perspective view of illustrative equipment of the blocking steps identified in FIG. 2.

FIG. 7 is a schematic perspective view of hopper, feeder and blocker equipment as identified in FIG. 2, and FIG. 8 is a schematic perspective view of illustrative equipment for the blocking step. Typically the pieces will have a minor dimension of at least about ¼ inch and a major dimension of less than 1 inch. Pieces within this general size range will be free flowing when frozen, bite-sized for eating and easily measure in portion controlled amounts. The size of the pieces will be such that does not destroy the texture of the potato pulp, preferably leaving it with the texture and mouthfeel of baked potato as broken apart with a fork in readiness for eating. In FIG. 7, a box of potatoes $11_f$ as prepared and frozen above is dumped onto a chute 282. Equally within the invention, the frozen flattened potatoes $11_f$ could be transferred directly from the freezer 24 for use in this step. The chute 282 leads to a series of secondary guide chutes 284, which align the potatoes $11_f$ with feed chutes 286 for direct feed into blocker 30, which cuts and/or breaks the potatoes $11_f$ into the desired sized pieces.

While shown in FIG. 7, the blocker 30 is best shown in FIG. 8 to be comprised of lower feed rollers 302, upper feed rollers 303, blocking blades 304 and blocking anvil 305. The lower and upper feed rollers 302, 303 grip the profiled or flattened potatoes $11_f$ and positively feed them toward rotating blocking blades 304, 304' and blocking anvil 305. Instead of feed rollers, other feed means such as belts, pistons, cams scrapers, or the like, can be employed to move the potatoes though the blocking blades or other means for subdividing the potatoes.

Figure 9:
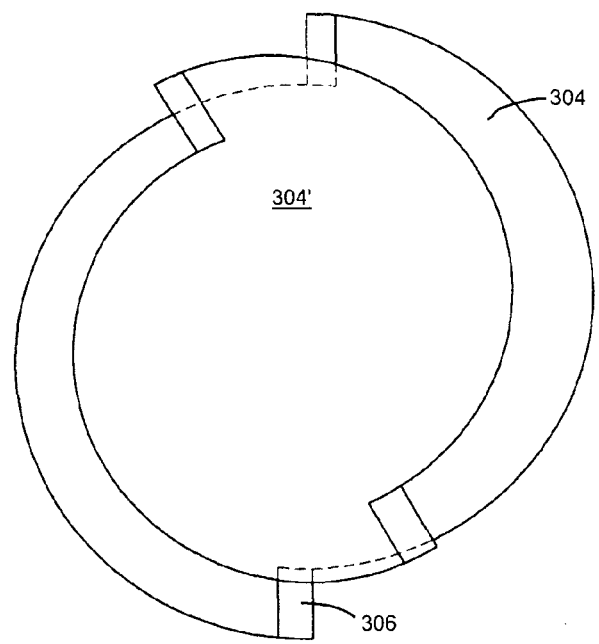
FIG. 9 is a schematic side elevation of cutting blades for an apparatus as shown in FIG. 8.
Figure 10:
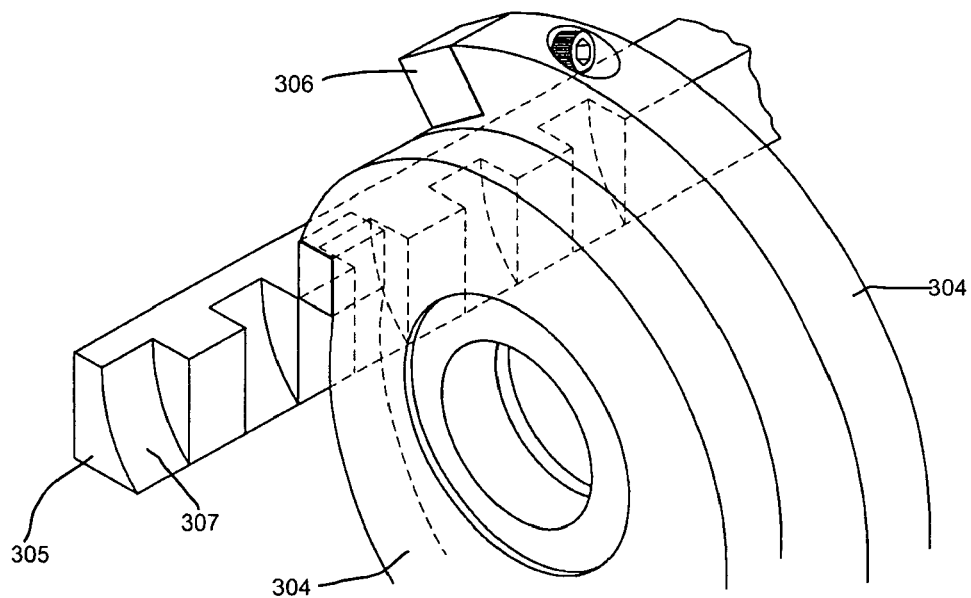
FIG. 10 is a schematic perspective, detail view of illustrative equipment of the blocking illustrated in FIG. 8.

A plurality of blocking blades 304 are shown aligned along a central drive shaft (not shown) which supports and positively moves the blades. The individual blades 304 are preferably many in number and angularly offset to enable drive with a fairly constant torque despite the impaction of the blades against the potatoes which are forced against the anvil to cause fracture into pieces of the desired size. In one particular embodiment, there are thirteen blades 304, each having a cutting edge width (in the direction parallel to the axis of rotation) of just under an inch, angularly offset progressively by just less than 30°. In this configuration, blades 304, 304' are spaced and moved to even out fluctuations in applied torque to the shaft. Other means for subdividing the potatoes can be employed, e.g., impaling and cracking means, knives, cleavers, or the like, which achieve the desired degree of subdivision without adversely affecting the desired baked potato texture. As can be seen also, probably best from FIG. 9, adjacent blades 304, 304' are staggered between two different sizes, the larger one having the cutting edge 306 extending about ½ inch more radially than an adjacent smaller blade 304'. Reference again to the anvil 305 shows grooves 307 alternating therein to accommodate the larger blades 304. This arrangement of cutting blades 304, 304' having a cutting insert 306 and anvil 305 is shown in greater detail in FIG. 10.

Figure 7A:
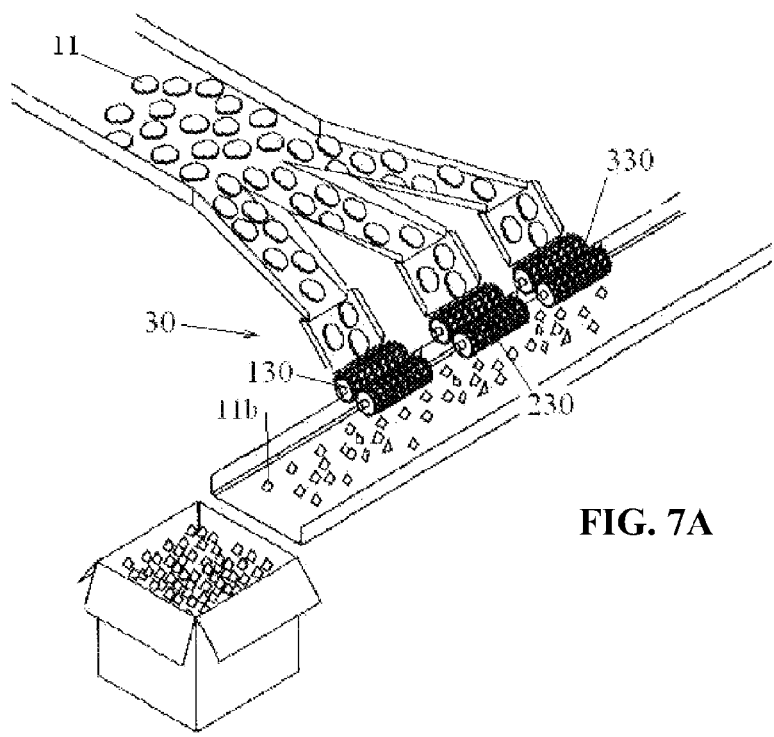
FIG. 7A is a schematic perspective view of alternative blocking and conveying equipment for fracturing and transferring baked potatoes after freezing and conveying the resulting fractured potato pieces.

In an alternative embodiment, the potatoes 11 are shown in FIG. 7A being conveyed into blocker equipment, generally 30, as identified as roller pairs 130, 230 and 330 in this schematic perspective view. It is an advantage of the invention that this embodiment does not require that potatoes be "profiled" or flattened, but flattening is preferred because it tends to limit the production of fine particles. See, step 22 in FIG. 1 herein and the full description herein to flatten the potatoes to a thickness of about an inch or so.

Typically the pieces from the process and apparatus of this invention will have a minor dimension of about 1 inch and a major dimension of about 1 inch. Obviously, adjustments of the size of the blades and their spacing can provide other sizes, e.g., from about 0.5 in any one linear dimension up to 1.5 inches in any other. It is an advantage of the present invention, with the target size being a one inch cube, that fines are kept to a minimum, e.g., pieces smaller than about 6 mm, will make up less than about 10% by weight, and preferably less than 5% by weight of the total product.

Pieces within this general size range will be free flowing when frozen, fork or bite-sized for eating and easily measured in portion-controlled amounts. The size of the pieces will be such that does not destroy the texture of the potato pulp, preferably leaving it with the texture and mouthfeel of baked potato as broken apart with a fork in readiness for eating.

FIG. 8A shows the blocking or cutting procedure from the side in a schematic side elevation. The apparatus 30 includes at least one roller pair comprising diagonally-opposed, spaced cutting blades 132, 132' for subdividing the potato into discrete pieces. The arrows indicate the rotation of one roller pair, 130 and 130'. The rollers each have sturdy cutting blades 132, 132' projecting from the roller surfaces. The blades are preferably diagonally aligned, e.g., at an acute angle such as from about 15° to about 60°, typically within the range of from about 20° to about 40°, e.g., from about 25° to about 35°, with respect to a line passing through the axis 134 of one of the rollers, e.g., 130, and will be diagonally opposed from one roller of the pair to the other. The length of the blades 132, 132' in the direction of the axis 134 of the rollers will typically be less than about 4 inches, say from about 0.5 to 2 inches, e.g., about 1 inch, and the blades will be spaced circumferentially by about an inch or so, and will be axially offset, from one roller to the other, typically by the axial length of the blades, thereby leaving gaps between blades on a roller. The gaps on the two rollers are preferably complimentary. A blade on one roller will preferably be pressed into a potato on one side while an offset blade will be pressed into the other side will be pressed into the other side of the potato. This type of arrangement has been found to provide clean fracturing of the frozen potatoes into good-sized pieces, similar to what one might obtain by breaking up a hot baked potato with care with a fork for eating. The dimensions and spacing of the blades, as well as the degree to which the potatoes are flattened can be varied to obtain the desired product size of product pieces, $11_b$.

Broken, frozen potato pieces $11_b$ fall from the blocker 30 and are collected by means not shown. The collected potato pieces are essentially free flowing and will remain so when properly stored under freezer conditions.

Figure 11:
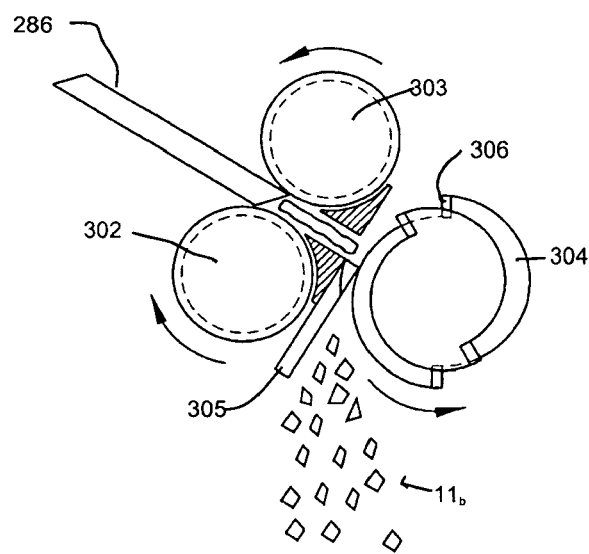
FIG. 11 is a schematic side elevation of the of equipment shown in FIG. 8.
Figure 12:
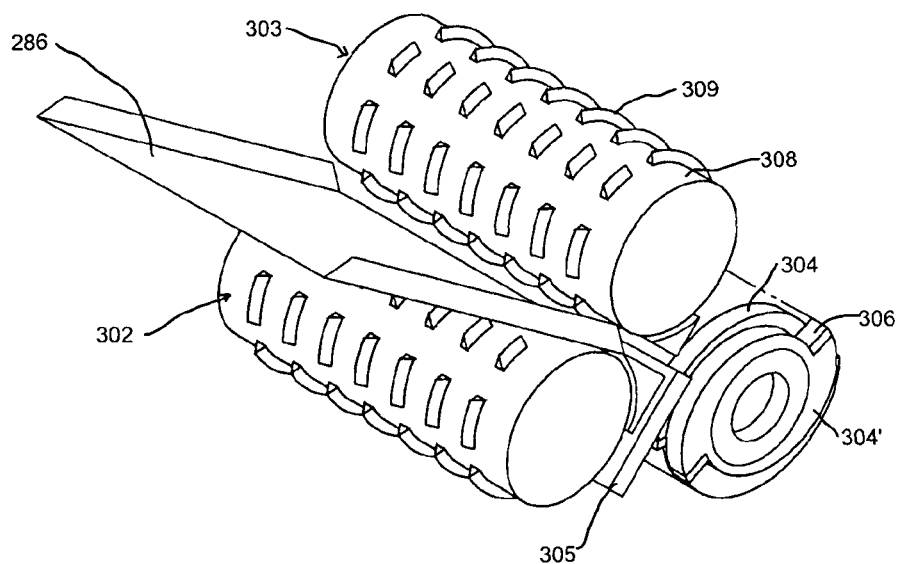
FIG. 12 is another schematic perspective of the equipment shown in FIG. 8.
Figure 13:
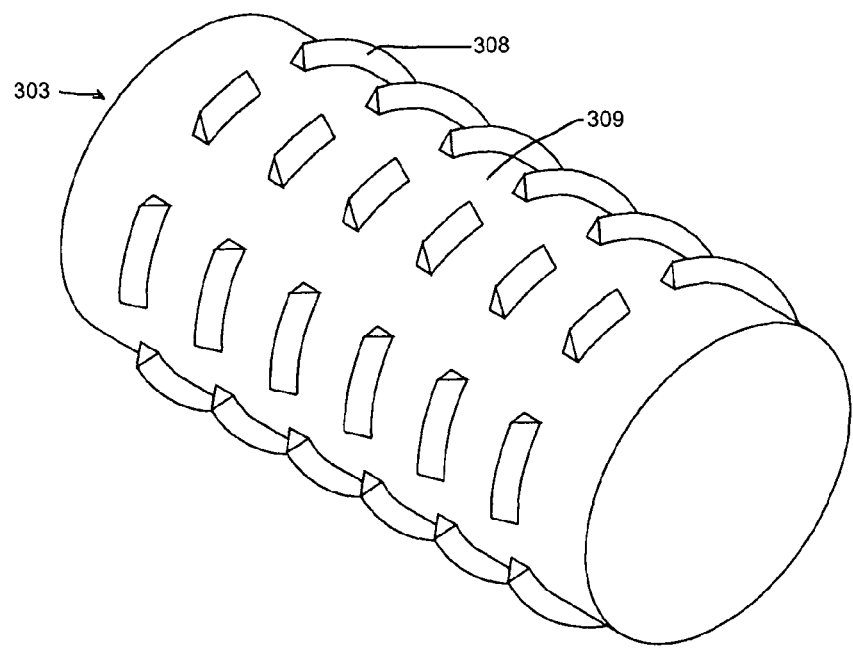
FIG. 13 is a schematic perspective, detail view of illustrative rollers for the equipment shown identified in FIG. 8.

FIG. 11 shows the cutting procedure from the side in a schematic side elevation, which indicates the rotation of the feed rollers 302, 303 and the cutting blades 304, 304'. FIG. 12 shows this arrangement from yet another perspective, and FIG. 13 shows the detail of a feed roller 302, 303 showing raised projections 308 on cylindrical surface 309 which help provide a positive grip and feed of the potatoes $11_f$ through the blocker 30.

Figure 14:
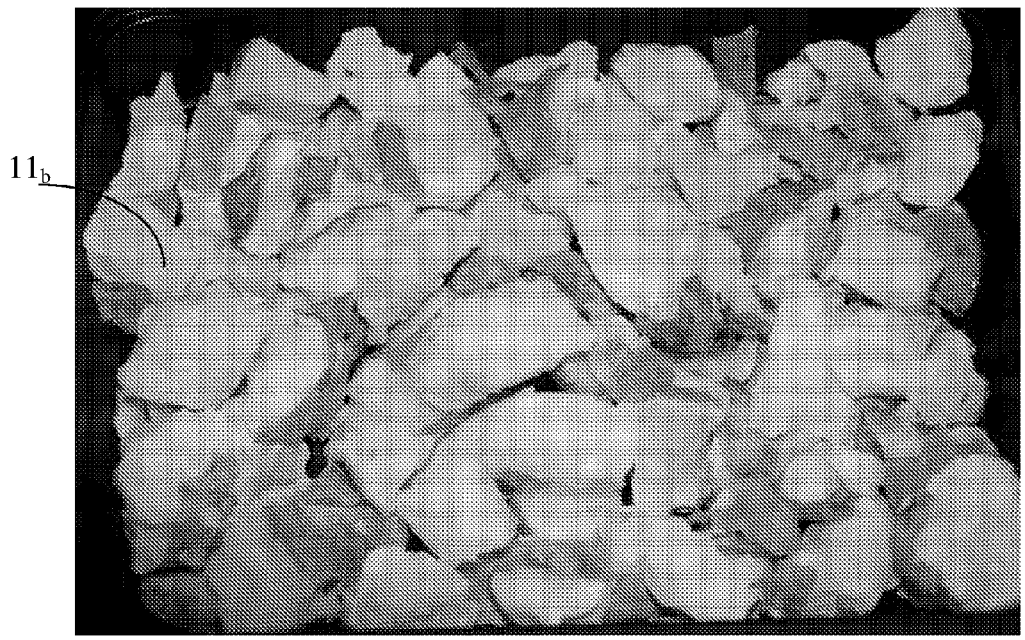
FIG. 14*a* is a photograph of potato product prepared according to the invention.
FIG. 14*b* is a photograph of potato and sauce product prepared according to the invention.
Figure 14:
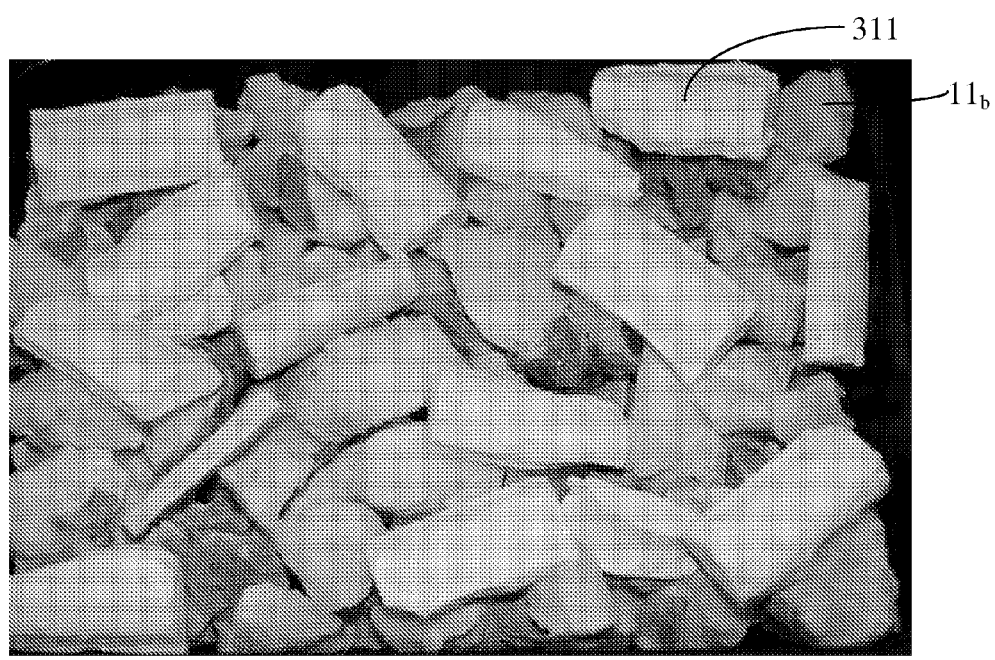

FIG. 14a is a photograph of potato product prepared according to the invention. The potato pieces $11_b$ can be packaged as such in plastic bags for bulk distribution or in single of multi-serving packages. If desired, the packages can be adaptable to microwave heating for final product preparation. It is an advantage of the invention that sauces or toppings, liquid, solid or a combination, can be added to the potato pieces in a package. The sauces or toppings can be easily added as meltable chunks 311 that become flowable or spreadable upon heating, as shown in FIG. 14b, which is a photograph of product prepared according to the invention having potato pieces $11_b$ and meltable sauce chunks 311. Typical sauce chunks will comprise cheese, sour cream, butter, margarine and the like. These chunks can be of a size suitable for the size of the potato pieces and can include inclusions such as bacon, broccoli, onions, and the like.

The following examples are presented to further illustrate and explain the invention and are not to be taken as limiting in any regard. Unless otherwise indicated, all parts and percentages are by weight based on the product or formulation at the indicated stage of processing.

EXAMPLE 1

This example illustrates the preparation of potato products according to the invention.

Russet Norkotah potatoes having an average weight of about 6 ounces were processed according to a process as outlined in FIG. 1. The potatoes were scrubbed and arranged in a level layer on a mesh conveyor. The potatoes were passed through an oven maintained at 420° F. for about 55 minutes, during which they were baked to a moisture content of about 72%. The skins of the baked potatoes were then fractured by a series of rotating blades as shown in FIG. 3, where the skins were fractured around their circumferences. The potatoes were then passed down channels while being sprayed with water for a total hydration time of about 2.25 minutes to increase the moisture content of the potatoes to about 73.5%. The potatoes were then conveyed under a profiling apparatus to flatten the potatoes to a thickness of about ¾ of an inch. The flattened potatoes were then passed through a commercial freezer having a first zone at a temperature of about 0° F. and a second zone at a temperature of about −40° F. for about 45 minutes, until the potatoes are substantially fully frozen. The flattened, frozen potatoes are then collected in plastic-line corrugated cardboard totes and stored in a freezer until needed for further processing. The frozen, flattened potatoes were fed to a blocking device and broken into pieces which set a target potato piece size of 7/16 inch by ¾ inch by ¾ inch, with the actual pieces being randomly sized with this as being a fair description of average dimensions. The product is then packaged in polyethylene bags of the type ordinarily used for packaging frozen vegetables or French fries.

The resulting frozen potatoes are prepared for consumption by heating in a microwave oven.

EXAMPLE 2

This example illustrates the preparation of potato products with a sauce ingredient according to the invention.

About 18 parts of potato pieces as prepared in Example 1 were simultaneously fed to bags along with 8 parts of frozen chunks (approximately 10×15×40 mm) of sauce mix of the following formulation:

| Ingredient | Parts |
|---|---|
| Water | 41 |
| Cheddar Cheese | 40 |
| Butter | 15 |
| Actoloid 2124, Stabilizer and emulsifier | 2 |
| Joha S9, phosphate salt blend for emulsification | 1 |
| Sodium chloride | 1 |
| Total | 100 |

The resulting mixture of frozen potatoes and sauce is prepared for consumption by heating in a microwave oven.

EXAMPLE 3

This example reports a textural evaluation of the pulp of potatoes baked according to the invention with control samples to illustrate the textural properties of potato pulp when baked in accord with the invention and compare them to products not optimally processed.

Objectives:

To analyze and differentiate the characteristics of internal texture or pulp of potatoes baked to 72.0% moisture considered ideally baked potatoes from raw potatoes, potatoes baked to different moisture levels, and mashed potatoes.

Samples Analyzed:

Raw Potatoes

Potatoes baked to 75.7% moisture

Potatoes baked to 72.0% moisture

Potatoes baked to 66.0% moisture

Mashed Potatoes

Sample Preparation:

Raw and Baked Potatoes

Use Russet Norkotah variety from the same grower, field, and lot, weight range between 5.75 and 6.25 oz.

Determine specific gravity and solid using Brine Solution method

Bake potatoes in a forced-air convection oven set at 325° F. until reaching moisture levels (calculated by weight) as mentioned above Cut each potato crosswise to about 3 centimeter thick. Make sure the surface is as flat and even as possible Put a 3 cm thick potato slab on the base table of the Texture Analyzer Follow operating procedure of LFRA Texture Analyzer Mashed Potatoes Use commercial dry potato flakes Weigh 50 grams of potato flake Measure 250 ml of 150° F. water Gently pour flake into water Rehydrate for 5 minutes Fluff Weigh 175 grams of mashed potato and put in a round container (3" diameter, 2" high)

Smooth the top surface to ensure it is as smooth as possible

Follow operating procedure of LFRA Texture Analyzer

Analytical Method:

To be able to objectively differentiate the characteristics of internal texture among potatoes baked to different moisture levels, raw potatoes, and mashed potatoes, Texture Analyzer is used. Texture Analyzer being used for this analysis is Brookfield Texture Analyzer, Model LFRA TA, 4500 g, 115 v.

The Texture Analyzer measures the resistance of potatoes to an applied force. The force is applied through a vertical compression of a TA44, 4 mm diameter flat end stainless steel probe, which is driven through a set distance at a set speed into potato pulp. The resistance is then measured through a load cell in a unit of gram per every hundredth of a second.

Parameters for Texture Analyzer are set as follows:

The trigger point—5 grams (A load measured by a Texture Analyzer to indicate that the probe is in contact with the sample. Once the trigger point is reached, the test will begin until it reaches a defined distance at a defined speed.)

Test Speed—2 mm/second

Distance—10 mm. (With a 3 cm thickness of potato slabs, a probe will travel for 10 mm after reaching a trigger point, within 1 mm after touching a surface, which is close to a center of potatoes)

The following calculations are measured:

Rigidity: Load (gram) on the sample at a specified deformation (set at 10 mm)

Mean Load: Arithmetic mean (gram) of load between specified start and stop times (set between 4 mm and 10 mm after the point where the trigger point is reached)

Analytical Procedures:

After the samples are prepared, they are placed on the base table approximately 5 mm below the end of the probe. After the parameters are set, the testing starts as the probe travels vertically at a speed of 2 mm/second. As soon as the trigger point is reached, the load is measured as the probe penetrates for 10 mm before retracting to the original position. The graph is plotted between load and distance. The final measurements of rigidity and mean loads are also calculated.

A puncture test is done in 3 different locations of each potato. A total of 20 potatoes are tested per set of samples. Therefore, 60 data points are generated for each set of samples to ensure that sufficient data is generated and collected and thus provides statistically significant conclusions.

Figure 15:
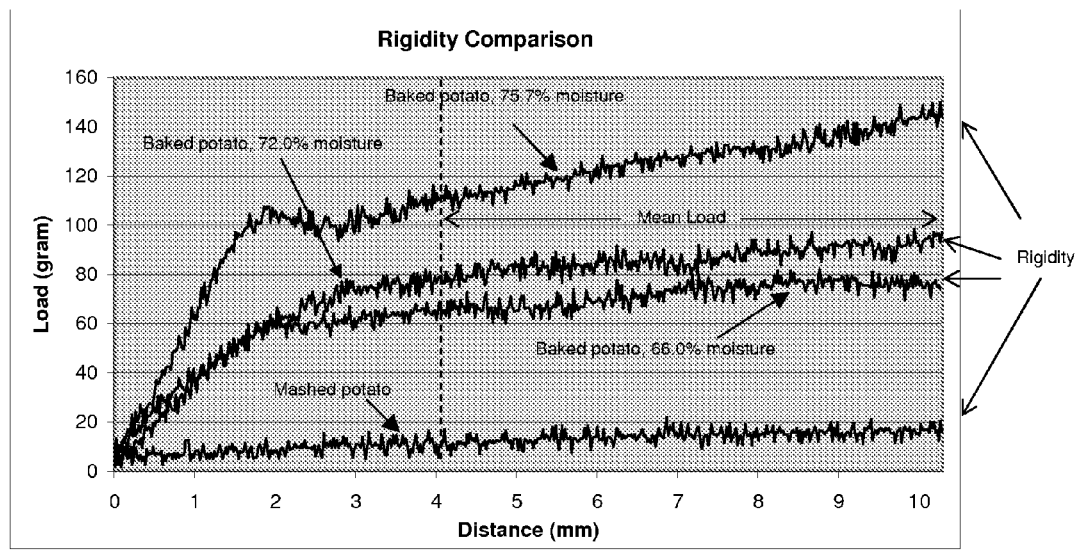
FIG. 15, Graph 3-1, is a Comparison of Load vs. Distance of potatoes Baked to 75.7%, 72.0%, 66.0% Moisture, And Mashed Potatoes according to Example 3.

Results:

As a probe travels for 10 mm through pulp of potatoes, load is measured at every hundredth of a second. Data is generated and the graph between load and distance is plotted. Examples of the plots are in FIG. 15, Graph 3-1, as shown below.

Rigidity is the load measured at the exact 10 mm. Mean load is a calculation of load/force measured between 4 mm and 10 mm after a trigger point is reach. Loads measured before 4 mm are not used in a calculation due to an increment of load at the initial penetration that would be misleading for mean load.

Raw potatoes require extremely high load to puncture through, being more than ten times that of the cooked samples, and are not shown in Graph 3-1. The plots are examples of one puncture test. In order to conduct an analysis that generates significant and reliable data, we conducted tests with 20 potatoes and 3 different puncture tests per potato for each set of samples. Therefore, 60 data points are generated per set of samples. Table 3-1 summarizes the rigidity data from these tests.

TABLE 3-1

| | Average - Rigidity (gram) | | | | |
| --- | --- | --- | --- | --- | --- |
| | Raw Potatoes | Baked Potatoes, 75.7% | Baked Potatoes, 72.0% | Baked Potatoes, 66.0% | Mashed Potatoes |
| Average | 2470.07 | 143.69 | 94.95 | 70.86 | 16.33 |
| Min | 1938.00 | 106.33 | 65.17 | 49.83 | 12.67 |
| Max | 2970.17 | 189.00 | 116.50 | 97.50 | 19.83 |

Table 3-2 summarizes the mean load data from these tests.

TABLE 3-2

| | Average - Mean Load (gram) | | | | |
| --- | --- | --- | --- | --- | --- |
| | Raw Potatoes | Baked potatoes, 75.7% | Baked Potatoes, 72.0% | Baked Potatoes, 66.0% | Mashed Potatoes |
| Average | 2275.90 | 129.06 | 92.54 | 74.12 | 14.55 |
| Min | 1929.11 | 97.77 | 62.92 | 52.74 | 12.47 |
| Max | 2668.12 | 170.15 | 118.84 | 104.78 | 16.36 |

Conclusions:

According to Graph 3-1 there are significant differences of resistance or force required to penetrate through potato pulp among all samples, especially between raw vs. baked potatoes and baked potatoes vs. mashed potatoes. Raw potatoes require the most force, indicating the hardest texture among all samples. As potatoes are baked, moisture is removed and potato or starch cells are cooked or gelatinized causing the texture to get softer. The longer potatoes are baked, the less amount of load required during penetration. Mashed potatoes require the least amount of force during penetration.

Due to natural variation of potatoes, such as shape, cell structure, and solids distribution, the rate of heat transfer varies during baking. Therefore, in order to generate reliable data, we measure not only rigidity, which is the load at the exact 10 mm after a trigger point is reached, but also mean load, which is an average of all loads measured between 4 mm and 10 mm after the trigger point is reached. This provides an accurate measurement of the load required to penetrate through the total distance.

Differences of both average rigidity and mean load of raw potatoes, baked potatoes at different moisture levels, and mashed potatoes are significant.

We found that all samples of raw potatoes, potatoes baked to 75.7% moisture, and mashed potatoes consistently show significant differences of load measured for both rigidity and mean load. Only 1 out of 20 samples of potatoes baked to 72.0% moisture shows slightly lower load required than the rest of the samples. Also 1 out of 20 samples of potatoes baked to 66.0% moisture shows slightly higher load required than the rest of the samples. The amount of loads measured of these 2 samples is slightly different than the rest of the data; therefore, we believe this is contributed from a variation of total solids or solids distribution in potatoes even with potatoes that come from the same lot and field.

The objective results from texture analysis support our subjective sensory evaluation that texture of ideally baked potatoes (baked to 72.0% moisture) is significantly different from raw potatoes, mashed potatoes, or even potatoes that are under baked (baked to 75.7% moisture) and over baked (baked to 66.0% moisture). As potatoes are baked, internal temperature increases to the point that water starts to evaporate through the intercellular capillaries. Cell structure of potato starch, comprising of Amylose (straight chains of glucose units) and Amylopectin (branches of glucose units) also changes due to thermal reaction. Crystalline structure of Amylopectin breaks down into smaller chains increasing the ability to absorb water inside the cell and swell. This process occurs in under baked potatoes but not to the point that yield ideal texture we prefer. Our potatoes baked to 72.0% moisture possess the texture we look for in perfectly baked potatoes. As potatoes are baked longer, which we call over baked, the cell structure is completely broken down. The cells are collapsed. Excessive amount of water is removed, especially from the outer layer of the tuber. This is very noticeable from soft and mushy internal texture and hard outer skin.

EXAMPLE 4

This example reports a textural evaluation to analyze and differentiate the characteristics of potato peel after potatoes are baked to 72.0% moisture without rehydration from those being rehydrated after baking.

Samples Analyzed:

Potatoes baked to 72.0% moisture

Potatoes baked to 72.0% moisture, followed by a rehydration step

Sample Preparation:

Baked Potatoes without Rehydration

Use Russet Norkotah variety from the same grower, field, and lot, weigh range between 5.75 and 6.25 oz.

Determine specific gravity and solid content using Brine Solution method

Bake potatoes in a forced-air convection oven set at 325 degree Fahrenheit until reaching 72.0% moisture (calculated by weight)

Put a whole potato on the base table of the Texture Analyzer within 2 minutes after baking Follow operating procedure of LFRA Texture Analyzer Baked Potatoes with Rehydration Use Russet Norkotah variety from the same grower, field, and lot, weigh range between 5.75 and 6.25 oz.

Determine specific gravity and solid using Brine Solution method

Bake potatoes in a force convection oven set at 325 degree Fahrenheit until reaching 72.0% moisture (calculated by weight)

Immediately soak potatoes in 120 degree Fahrenheit water for 1 minute. Alternatively, potatoes may be showered with cold tap water for a period of 2 to 2½ minutes with equivalent results Leave potatoes on a dry clean towel to dry out excess water and equilibrate for 1 minute Put a whole potato on the base table of the Texture Analyzer within 2 minutes after allowed to equilibrate Follow operating procedure of LFRA Texture Analyzer Analytical Method:

To be able to objectively differentiate the characteristics of potato peel between regular baked potatoes and those being rehydrated after baking, Texture Analyzer is used. Texture Analyzer being used for this analysis is Brookfield Texture Analyzer, Model LFRA TA, 4500 g, 115 v.

The texture analyzer measures the resistance of potato peel to an applied force. The force is applied through a vertical compression of a TA44, 4 mm diameter flat end stainless steel probe, which is driven through a set distance at a set speed into potatoes. The resistance is then measured through a load cell in a unit of gram per every hundredth of a second.

Parameters for Texture Analyzer are set as follows:

The trigger point—5 grams (A load measured by a Texture Analyzer to indicate that the probe is in contact with the sample. Once the trigger point is reached, the test will begin until it reaches a defined distance at a defined speed.)

Test Speed—2 mm/second

Distance—20 mm (Due to different thickness of peel, a probe will travel for 20 mm after reaching a trigger point in order to ensure that the probe will penetrate through the peel before 20 mm is reached)

The following calculations are measured:

Peak Load: Peak load (gram) recorded at any time during test

Deformation @ Peak Load: Distance (mm) traveled by probe at the point where peak load is achieved Work done to Hardness: Calculates work done (energy) required to obtain a given deformation or target value (set to calculate energy used from the trigger point to the point where the peak load is achieved)

Analytical Procedures:

After the samples are prepared, they are placed on the base table approximately 5 mm below the end of the probe. After the parameters are set, the testing starts as the probe travels vertically at a speed of 2 mm/second. As soon as the trigger point is reached, the load is measured as the probe penetrates for 20 mm before retracting to the original position. The final measurements of peak load, deformation at peak load, and work done to hardness are also calculated.

Puncture test is done in 3 different locations of each potato. A total of 20 potatoes are used per set of samples. Therefore, 60 data points are generated for each set of samples to ensure that sufficient data is generated and collected and thus provide a statistically significant conclusion.

Results:

As a probe travels and penetrates through the peel, load is measured at every hundredth of a second. Data is generated and the graph between load and distance is plotted. Examples of the plots are in FIG. 16 A, Graph 4-1. The graph shows that it requires extremely higher load and a lot longer time to break through the peel of regular baked potatoes than those being rehydrated after baking. The graph is annotated to show how the peak load, deformation at peak load, and work done to hardness are measured during a puncture test. Peak load is the highest load measured during the test. Deformation at Peak load is the distance of the probe where the peak load is reached. Work done to hardness is the energy used to break through the peel, which equals to the area under the graph from the trigger point to the peak load.

Plots between load and distance shown in Graph 4-1 are examples of one puncture test. In order to conduct an analysis that generates significant and reliable data, we conducted tests with 20 potatoes and 3 different puncture tests per potato for each set of samples. Therefore, 60 data points are generated per set of samples. The results are summarized in Table 4-1, below:

TABLE 4-1

Comparison Of Peak Load Of Baked Potatoes Without And With Rehydration

| | Average - Peak Load (gram) | |
|---|---|---|
| | Baked potatoes without Rehydration | Baked Potatoes with Rehydration |
| Average | 1149.88 | 614.71 |
| Min | 730.17 | 471.17 |
| Max | 1662.17 | 879.33 |

Figure 16:
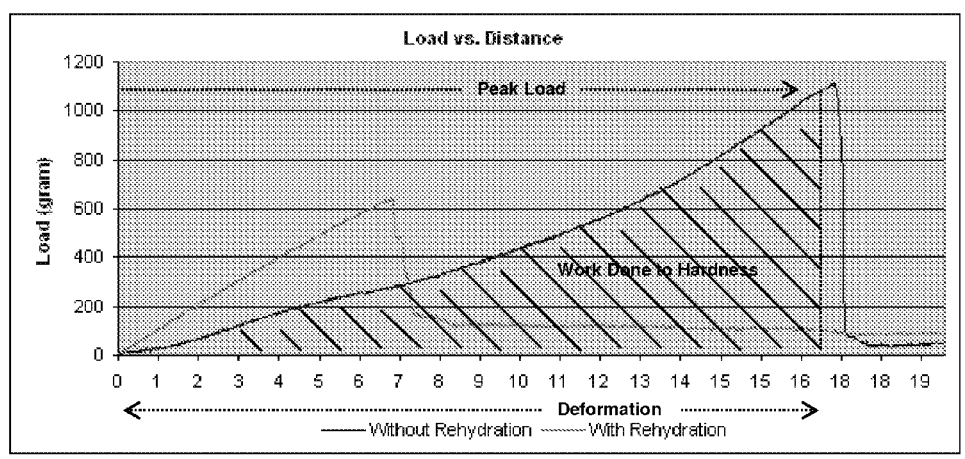
FIG. 16 B, Graph 4-2, depicts Peak Load comparison of 20 Potatoes (Without and With Rehydration) according to Example 4.
Figure 16:
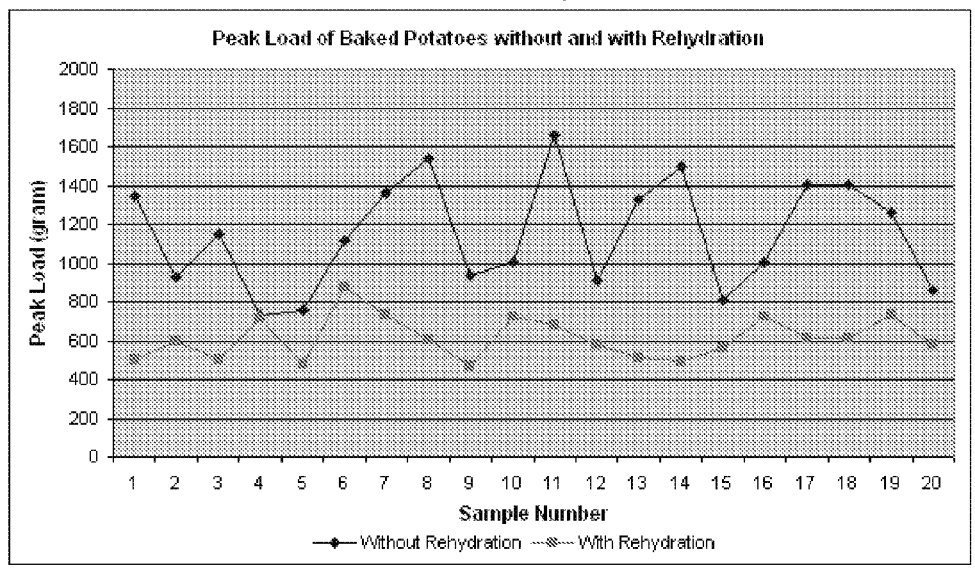
Figure 16:
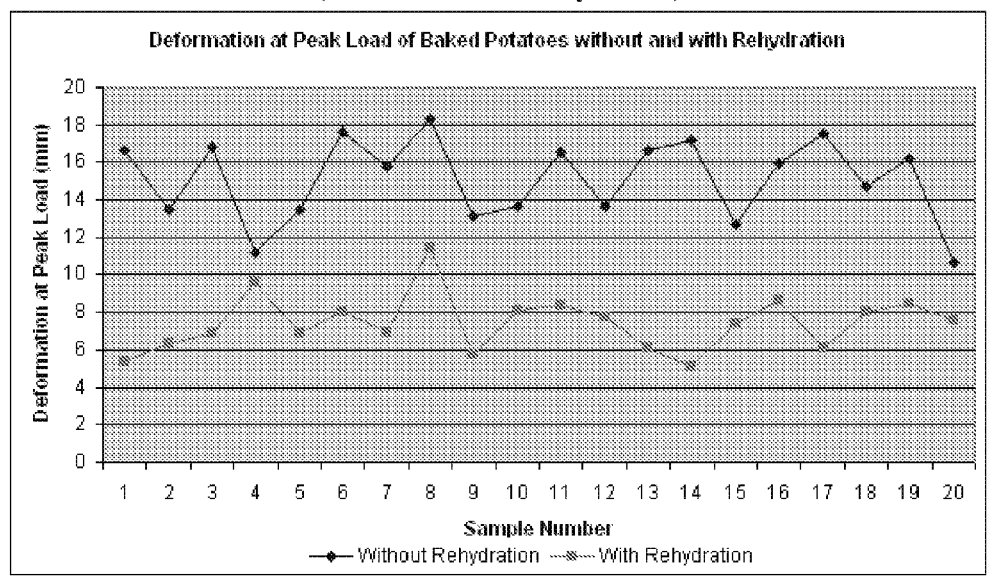
Figure 16:
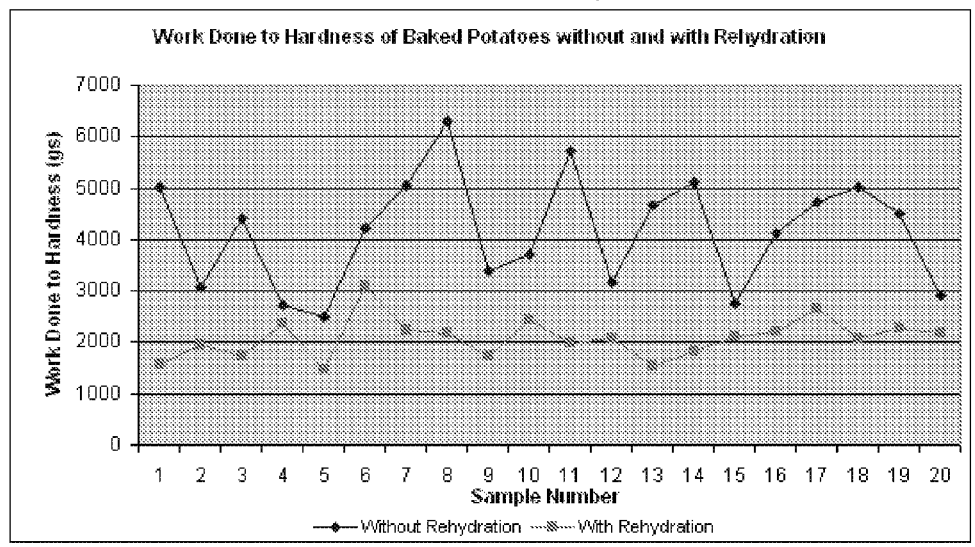

Peak loads for all 20 potatoes are displayed in FIG. 16 B, Graph 4-2.

In addition to peak load measurement, we also measured the distance where the peak load is achieved, called deformation at peak load as displayed in Table 4-2.

TABLE 4-2

Comparison of Deformation at Peak Load of Baked Potatoes Without and With Rehydration

| | Average - Deformation at Peak Load (mm) | |
|---|---|---|
| | Baked Potatoes without Rehydration | Baked Potatoes with Rehydration |
| Average | 15.10 | 7.45 |
| Min | 10.69 | 5.11 |
| Max | 18.37 | 11.49 |

FIG. 16 C, Graph 4-3, shows plots of average deformation at peak load of each potato tested in all samples tested.

The last measurement we use is called Work Done to Hardness, which is energy required to break through potato peel. This is summarized in Table 4-3.

TABLE 4-3

Comparison of Work Done to Hardness of Baked Potatoes Without and With Rehydration

| | Average - Work Done to Hardness (gs) | |
|---|---|---|
| | Baked Potatoes without Rehydration | Baked Potatoes with Rehydration |
| Average | 4152.34 | 2086.89 |
| Min | 2502.52 | 1478.10 |
| Max | 6283.72 | 3113.26 |

FIG. 16 D, Graph 4-4, shows the work done to hardness comparison of 20 potatoes without and with rehydration.

Conclusions:

According to Graph 4-1, there are significant differences of resistance or force required to penetrate through potato peel between regular baked potatoes and those being rehydrated after baking. Regular baked potatoes possess very hard and tough skin after being removed from the oven. As shown in Graph 4-1, it requires over 1000 grams to penetrate through the peel and takes about 17 mm to achieve that.

After potatoes are baked and removed from the oven, potatoes are immediately soaked in warm water (120 degree Fahrenheit) for 1 minute or showered with cold tap water for 2 to 2½ minutes. Potatoes absorb approximately 1-2% of water back during rehydration. After rehydration, potatoes are set on a clean towel to let the moisture equilibrate throughout the tuber and also allowed excess amount of water outside the peel to evaporate. After 1 minute of equilibration, outside peel is dry without excess water remaining while providing softer texture of peel, compared to regular baked potatoes. As shown in Graph 4-1, it requires only slightly over 600 grams to penetrate through the peel and takes about 6 mm to achieve that.

Peel of regular baked potatoes are very hard and tough as we found that it requires almost twice as much force to penetrate through the peel compared to those being rehydrated afterward. In addition, the peel of regular baked potatoes is very chewy and leathery, as we need to chew several times to break it with our teeth. This is confirmed by our analysis that the peel of regular baked potatoes is stretched up to 15 mm before it is broken while it only stretches for 7 mm for those being rehydrated.

Due to natural variation of potato peel and some skin defect, peel could be hard but brittle which will result in high peak load but low deformation. Therefore, we do not only measure peak load and deformation at peak load but also the total amount of energy being used from the point where the trigger point is reached to the point where the peak load is achieved, called work done to hardness. We found that all samples consistently show significant differences of load required to break through the peel and distance where the load is achieved.

The objective results from texture analysis support our subjective sensory evaluation that textures of baked potato peel is significantly different from those being rehydrated after baking. Amount of water potatoes absorbed during rehydration helps soften the skin and makes it not only more appealing as far as overall appearance but also providing a lot less chewy and leathery texture.

EXAMPLE 5

This example reports a flavor evaluation of potatoes baked according to the invention with control samples to illustrate the flavor properties of potatoes of the invention and compare them to products not optimally processed.

The following samples were received for analysis:
1) Raw Potato w/79.2% Moisture
2) Baked Potatoes w/75.7% Moisture (Under Baked)
3) Baked Potatoes w/72.0% Moisture (Ideal Baked)
4) Baked Potatoes w/66.0% Moisture (Over Baked)

Background Information & Analysis Request

The baked potato samples listed in items 2 through 4 above were nitrogen-flushed, vacuum sealed and then frozen for transport and storage prior to analysis. Sensory trials indicate that baked potatoes with 75.7% moisture are under-baked and lacking optimum baked potato flavor. Baked potatoes that are heated to a final moisture content of 66% are considered over-baked (burnt aroma) and have poor textural properties. Studies have shown baked potatoes with a final moisture content of 72.0% yield an optimum and characteristic "baked potato" flavor that consumers desire. Raw potatoes are essentially devoid of any "baked potato" flavor and were submitted as a control. The analysis conducted comparative flavor profile analyses on the samples to quantify the types of compounds formed in the baking process and their concentrations.

Analytical Methodology

Flavor isolates were prepared and analyzed from all samples in duplicate using previously published generic methodology[1,2] including optimizations specific to this investigation. In these analyses, the potato samples were equilibrated to room temperature, cut into uniform cubes approximately 1 $cm^2$ using a food processor and mixed to produce composites. Aliquots (100 g) were then weighed and rapidly sealed into a custom design SS chamber type purge & trap apparatus. The chambers were heated to 50° C. and purged with nitrogen at a rate of 100 ml/min. for a total of 60 minutes. The volatile and semi-volatile flavor from the potatoes were trapped and concentrated on adsorbent cartridges containing Tenax-TA. The traps were spiked with internal standards (1.0 µg each of d-8 toluene & d-8 naphthalene) to facilitate quantification and normalization of the resulting data. The charged adsorbent traps were then connected to the Short Path Thermal Desorption system and thermally desorbed directly into the GC-MS system for final analysis. The thermal desorption conditions were 250° C. for 5 minutes. The resulting P&T-TD-GC-MS chromatograms were then subjected to a thorough scan-by-scan search of the data to identify all volatile and semi-volatile flavor constituents.

[1] Thomas G. Hartman et al., "Flavor Characterization Using Adsorbent Trapping-Thermal Desorption or Direct Thermal Desorption-Gas Chromatography and Gas Chromatography-Mass Spectrometry", in Flavor Measurement, Ho & Manley, editors, Marcel Dekker, Inc., NY 1993.

[2] Juan P. Salinas & Thomas G. Hartman, "Lipid-Derived Aroma Compounds in Cooked Potatoes and Reconstituted Dehydrated Potato Granules", in Lipids in Food Flavors, Ho & Hartman, editors, American Chemical Society, Washington D.C. 1994.

GC-MS chromatograms from the duplicate analyses of each potato sample show strong differences in chromatographic flavor profiles among the samples varying in final moisture content. Baked potato flavor is complex and consists of over 100 individual chemical compounds. The compounds that are important to "baked potato" flavor are not originally present in raw potato and are produced via thermal reactions during the baking process. The most important thermal reaction in the production of "baked potato" flavor is called the "Maillard Reaction" or "Non-Enzymatic Browning Reaction". These are heat-induced reactions that occur between reducing sugars (such as glucose) and amino acids that are present as precursors in raw potatoes. The Maillard Reaction is exceedingly complex and results in the formation of a plethora of important flavor and aroma compounds. A detailed description of the reaction is beyond the scope of this report but an excellent overview is given by Professor Donald S. Mottram in a book chapter titled "Flavor Compounds Formed during the Maillard Reaction"[3].

[3)] Donald S. Mottram, "Flavor Compounds Formed during the Maillard Reaction", in Thermally Generated Flavors, Parliament, Morello and McGorrin, editors, American Chemical Society, Washington D.C. 1992.

Basically, the flavor of all potato products is governed by two broad classes of compounds, lipid oxidation products and compounds generated from the Maillard Reaction. Lipid oxidation compounds arise from autoxidation of unsaturated lipid precursors present in potato (such as linolenic acid, etc.) and include a homologous series of aldehydes, ketones, furans and hydrocarbons. Lipid oxidation notes in potato are generally undesirable when levels become elevated and they are the rate limiting components that dictate shelf life of potato products. Lipid oxidation products are typically low in fresh potato products and since they are not terribly important to baked potato flavor they will not be discussed further in this report. On the other hand, the Maillard reaction is extremely important to flavor development in baked potato.

In the early stage of the Maillard reaction an important class of compound called "Strecker Aldehydes" are produced. These are simple reaction products of amino acids and reducing sugars. The most important Strecker Aldehyde in potato is called methional and this comes from the reaction of the amino acid methionine with reducing sugars such as glucose. Methional has a strong and characteristic flavor/aroma of potato. Without methional potato flavor could not exist. Flavor chemists have a term for this. They refer to the compound as "character impact". This means methional is the "character impact" compound of potato flavor. Other important Strecker Aldehydes that contribute to "baked potato" flavor include 3-methylbutanal (from isoleucine), 2-methylbutanal (from leucine) and phenylacetaldehyde (from phenylalanine).

When the temperature of baking increases and the moisture content drops more complex thermal reactions begin to occur. Sugars begin to dehydrate and caramelize, sulfur-containing amino acids decompose and generate hydrogen sulfide and other volatile sulfides and ammonia is released by deamidation of protein. These compounds further react into a more complex series of flavor compounds present in potato. One important class is called pyrazines. Pyrazines are compounds that begin to form at temperatures above when Strecker Aldehydes initiate. Pyrazines are responsible for toasted, nutty and roasted notes that are critical to baked potato flavor. Aside from pyrazines other nitrogen and oxygen-containing heterocyclic compounds such as pyrroles and oxazoles are produced.

A certain balance of Strecker Aldehydes and pyrazines are critical to ideal baked potato flavor. Too little of these components and the flavor will not be perceptible. Too much and the potato will have a burnt, overcooked flavor that is objectionable to most consumers. In the current study the Strecker Aldehydes and pyrazines (although all detected compounds are listed as well) have been selected as "indicator compounds" to fingerprint the optimum or "target" baked potato flavor profile.

The test results are discussed as follows:

Raw Potato, 79.2% Moisture

The flavor profile of the raw potatoes with 79.2% moisture are very low in thermal reaction products such as Strecker Aldehydes and pyrazines. Total Strecker aldehydes are only 420 µg, only a single pyrazine is detected (12 µg) and methional is barely present (16 µg). Raw potatoes have an earthy, musty and uncooked potato aroma character. The earthy, musty notes in the raw potato come from some lipid oxidation derived unsaturated aldehydes, ketones and alcohols with C8 chain lengths, the so-called mushroom aldehydes and mushroom alcohols (cis-2-octenal, trans-2-octenal, 1-octen-3-ol, etc.). Other contributors to the earthy aroma include phenolic compounds such as o-methylanisole and veratrole plus some lipid oxidation derived furans such as 2-pentylfuran that have powerful green, beany odor. The raw potatoes also have relatively high concentrations of linear paraffinic and olefinic hydrocarbons that are associated with the peel although these compounds do not impact odor much. Two compounds used for sprout control in the potatoes (SproutNip or chlorpropham and 1,2-dimethylnaphthalene) were also detected. Chlorpropham does not contribute to potato aroma and 1,2-dimethylnaphthalene has minimal contribution (slight musty).

Baked Potatoes, 75.7% Moisture (Under Baked)

The flavor profile of the baked potatoes with 75.7% moisture are distinctly different than the raw potato. The Maillard reaction compounds are beginning to appear but they are still undeveloped with respect to target baked potato aroma. The Strecker Aldehydes and pyrazines have increased to 2675 and 218 µg, respectively. A reduction in the paraffinic and olefinic hydrocarbons more prominent in the raw potatoes is observed as these compounds are lost to volatilization in the baking process and are not replenished by thermal reactions.

Baked Potatoes, 72.0% Moisture (Ideal Baked)

The flavor profile of the baked potatoes with 72.0% moisture show a complex pattern of fully developed Maillard reaction products including the Strecker Aldehydes, pyrazines and other thermally generated aroma compounds such as dicarbonyls (diacetyl, 2,3-pentanedione), pyrroles, short chain acids, sulfides and oxygen-containing heterocyclics. The levels of total Strecker Aldehydes and pyrazines have increased considerably to 6029 and 3385 µg, respectively. Sensory evaluation data indicates this particular flavor pattern to identify optimum baked potato.

Baked Potatoes, 66.0% Moisture (Over Baked)

The flavor profile of the baked potatoes with 66.0% moisture is extremely complex and indicates a burnt, overcooked flavor profile. The levels of total Strecker Aldehydes and pyrazines have increased to very high concentrations of 12199 and 59399 µg, respectively and these excessive levels contribute to the burnt, high-toast, overcooked notes associated with this product. In particular, the concentration of pyrazines has skyrocketed. Looking at the production of Strecker Aldehydes versus potato moisture content, it can be seen that the concentration rises linearly (approximately doubles with each incremental decrease in moisture content). The pyrazines behaved similarly for moisture contents in the range 79.2 through 72.0%. However, the pyrazines rise exponentially in the 66.0% moisture potatoes. This sample also shows a complex mixture of other advanced thermal reaction products not observed in the other samples.

EXAMPLE 6

This example reports an Iodine Index evaluation of potatoes baked according to the invention with control samples to illustrate the Iodine Index properties of the starch in potatoes of the invention and compare them to products not optimally processed. The Iodine Index test is used to measure the free starch in a potato. Russet Norkotah potatoes contain about 20-22% solid and 78-80% water on average. About 75% of solid contents consist of starch. Potato starch is composed of Amylose and Amylopectin. Amylose is a linear polymer of glucose linked with mainly $\alpha(1\rightarrow4)$ bonds. Amylopectin is a highly branched polymer of glucose linked in a linear way with $\alpha(1\rightarrow4)$ bonds while branching takes place with $\alpha(1\rightarrow6)$ bonds occurring every 24 to 30 glucose units.

Prior to cooking, the Amylopectin is in a co-crystalline complex with the Amylose. During baking, starch structure changes. Starch cells swell by absorbing water and increase in volume. The crystalline structure degrades, that is, it can be said to melt. The granules are disrupted, and Amylose is released. The longer this thermal reaction continues, the more the outer shell of the starch particles, which have highest crystallinity index, continue to collapse. Thus, more Amylose and Amylopectin inside the outer shell melt out. Amylose's $\alpha(1\rightarrow4)$ bonds promote the formation of a helix structure or a spiral form, like a coil spring. When reacting with Iodine-KI reagent, the triiodide ion fits neatly inside the helix structure of Amylose, resulting in a blue color polymer. This blue complex absorbs wavelength of light at 570 nm, so it can be measured by spectrophotometer.

Therefore, Iodine Index is used to indicate the extent of the reaction during the baking process. Amylopectin does not react with Iodine and therefore, does not produce the color, nor does cellulose or disaccharides.

Sample Preparation:
Use Russet Norkotah variety from the same grower, field, and lot, weigh range between 5.75 and 6.25 oz, and solid range between 20.5 and 21.5%
Determine specific gravity and solids content using Brine Solution method
Bake potatoes in a forced-air convection oven set at 325 degree Fahrenheit until reaching moisture levels (calculated by weight) as mentioned above
Cut potatoes crosswise close to the center of the tuber as possible into 3-4 very thin slices, approximately 1 mm thick
Remove and discard approximately 1 cm of the outer peel layer, retaining inner portion for samples.
Cut the sample into square cubes, about 1 mm².
Weigh the sample amount as indicated in the Analytical Method below Analytical Method
A standard method was used to determine Iodine Index, commonly known as "Blue Value", of raw and baked potatoes. Iodine complexes preferentially with Amylose, the linear fraction found in potato starch. When an excess of standard iodine solution is added, a stable blue complex is formed. This solution is then measured spectro-photometrically. The procedures are as follows:
Weigh out samples of potatoes that would yield 1.0 gram of solid content
Raw potatoes (% solid content of the raw potatoes used is 21.5%, equivalent to 78.5% moisture)
Sample size=1.0 gram/1-0.785
=1.0/0.215
=4.6 grams
Baked potatoes at 75.7% moisture
Sample size=1.0 gram/1-0.757
=1.0/0.243
=4.1 grams
Baked potatoes at 72.0% moisture
Sample size=1.0/1-0.72
=1.0/0.28
=3.6 grams
Baked potatoes at 66.0% moisture
Sample size=1.0/1-0.66
=1.0/0.34
=2.9 grams
Pour sample into a beaker containing 250 ml of deionized water heated to 50 degree Celsius
Set a beaker containing samples and a magnetic stir bar on a heated agitator and set it to stir for 5 minutes
Pour sample solution into centrifuge tubes and centrifuge at a maximum speed (at 100 setting on Dynac Centrifuge) for 10 minutes
Transfer 10 mls of clear solution with a pipette to a 50 ml volumetric flask, containing 1 ml of 0.02 N Iodine solutions. Dilute to 50 mls with deionized water
Make a blank solution of 1 ml of 0.02 N Iodine solutions and 49 ml of deionized water in another 50 ml volumetric flask
Mix the sample well
Set the spectrophotometer to a wavelength of 570 millimicrons
Use a blank solution as a reference sample
The reading from each sample solution is the Iodine Index Analytical Procedures:
We conducted the Iodine Index tests using 20 potatoes per each set of samples. Three samples were tested for each potato. This is to ensure that natural variation within a potato and among potatoes being used is taken into considerations. A total of 60 data points are generated for each set of samples to ensure that sufficient data is generated and collected and thus provides statistically significant conclusions.

Figure 17:
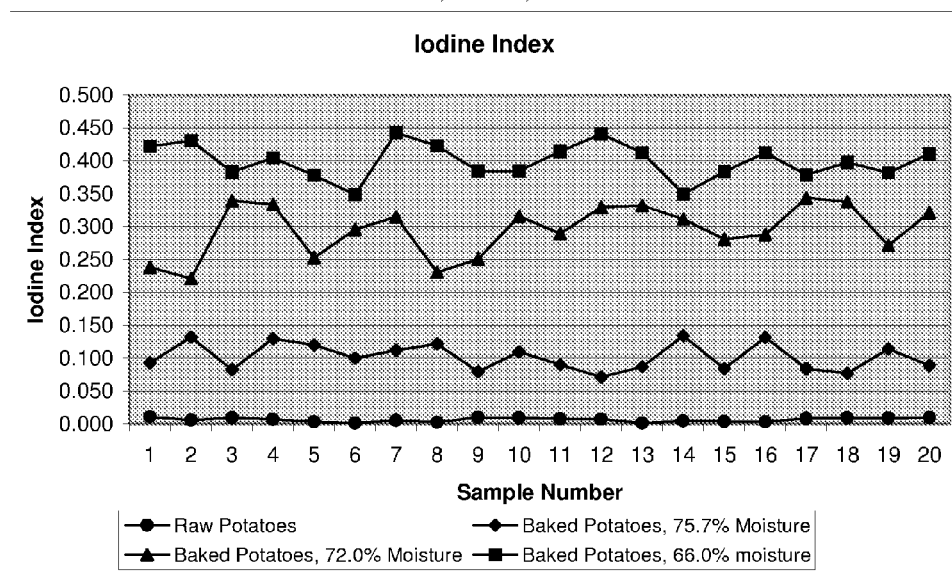
FIG. 17 A, Graph 6-1, graphs data on Iodine Index Comparison of Raw Potatoes and Potatoes Baked to 75.7%, 72.0%, and 66.0% Moisture according to Example 6.
Figure 17:
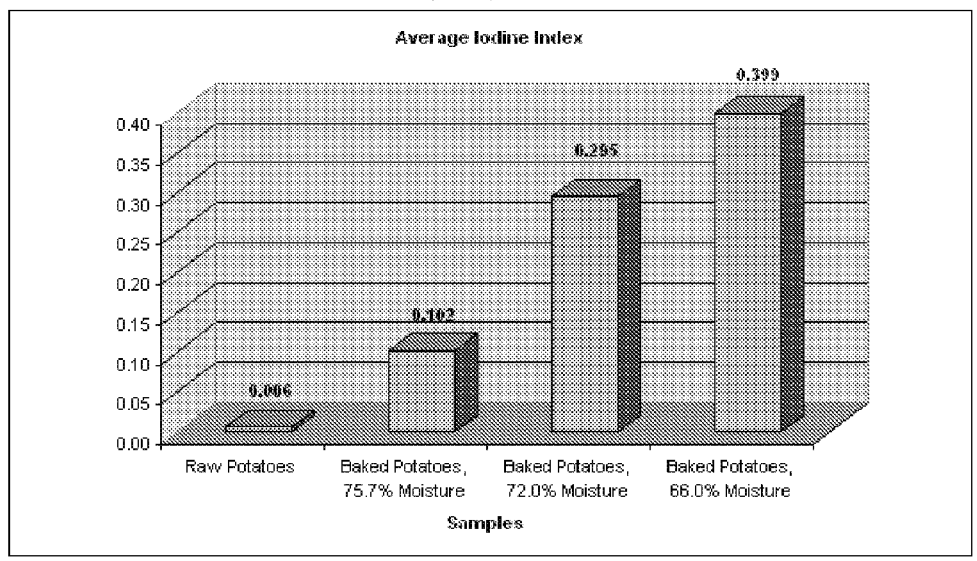

Results
The results of the Iodine Index tests with 20 potatoes for each set of samples is summarized in FIG. 17 A, Graph 6-1, with each data point is an average of 3 samples tested per each potato. As shown in the graph, raw potatoes have a very low Iodine Index compared to baked potatoes. As potatoes are baked longer as indicated by more moisture being removed, the Iodine Index also increases.

An average of the Iodine Index from all 20 potatoes for each set of samples is calculated and shown in FIG. 17 B, Graph 6-2.

Conclusions:
The results of average and range of Iodine Index are as follows:

|  | Average | Range |
|---|---|---|
| Raw Potatoes: | 0.006 | 0.001-0.011 |
| Baked Potatoes, |  |  |
| 75.7% Moisture | 0.102 | 0.071-0.134 |
| 72.0% Moisture | 0.295 | 0.221-0.343 |
| 66.0% Moisture | 0.399 | 0.348-0.442 |

The sample solutions of raw potatoes form yellowish color after mixing with Iodine-KI solution. This is slightly darker compared to a reference sample containing no starch. This indicates that raw potatoes contain a very minimal amount of free starch or Amylose.

Under-baked potatoes are potatoes that are baked until reaching 75.7% moisture, which take approximately 45 to 50 minutes baking time. Some Amylose is released during baking and more Amylose-triiodide compounds are formed. Therefore, Starch-Iodide solution turns yellowish-green to light green in color, and Iodine Index increases to 0.102.

As we continued baking potatoes until reaching 72.0% moisture content, which takes about 60 to 65 minutes, more crystalline structure breaks down and more Amylose is released. Sample solutions turn green to dark green in color. Iodine Index significantly increases to 0.295.

Over baked potatoes are potatoes that are baked until reaching 66.0% moisture, which takes about 120 minutes. Highest amount of Amylose is present in the sample solutions. As potatoes are baked for a very long period of time, cell wall starts to collapse and release Amylose and water from inside the cell. Excessively soft and wet texture is very noticeable. Starch-Iodide solution turns bluish-green to dark blue in color, and Iodine Index is as high as 0.399.

The invention is intended to provide a perfectly-baked potato texture and flavor, and we conclude that the Iodine Index values above provide a reliable means to determine if the proper degree of baking and, therefore, texture and flavor development have occurred.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

The invention claimed is:

1. A process for making a baked potato product that retains baked potato flavor and aroma during frozen storage, wherein a majority of potato skin in the product is attached to baked potato pulp, which comprises:
   baking a potato having skin and pulp portions to produce a baked potato having a moisture content within the range of from 70 to 75% and an Iodine Index within the range of from about 0.2 to about 0.4,
   rehydrating the baked potato,
   following rehydration and prior to subdividing, the baked potatoes are pressed to uniformly reduce their thickness to from ¼ inch to 1½ inches,
   freezing the baked potato;
   after freezing, subdividing the baked potato into discrete pieces of baked potato having a size of from 0.5 to 1.5 inches and wherein potato skin is attached to baked potato pulp; and
   packaging the discrete pieces of baked potato under frozen conditions to maintain a flowable characteristic.

2. A process for preparing a baked potato product according to claim 1, wherein the moisture content of the potato after baking is within the range of from about 70 to about 74%.

3. a process for preparing a baked potato product comprising discrete pieces of frozen baked potato including the skin, wherein potato skin is attached to baked potato pulp, and the potato product retains baked potato flavor and aroma during frozen storage, wherein a majority of potato skin in the product is attached to baked potato pulp, the process comprising:
   baking a potato at a temperature of from 300° to 450° F. for a time of from 45 minutes to about 90 minutes to produce a baked potato having a moisture content within the range of from 70 to 75% and an Iodine Index within the range of from about 0.2 to about 0.4,
   rehydrating the baked potato by contacting with water to increase the moisture content of the potatoes by from 1 to 3% by weight,
   following rehydration and prior to subdividing, the baked potatoes are pressed to uniformly reduce their thickness to from ¼ inch to 1½ inches,
   freezing the baked potato following rehydration,
   subdividing the baked potato into discrete pieces of a size of from about 0.5 to about 1.5 inches without mashing the pulp and wherein potato skin is attached to baked potato pulp,
   and packaging the discrete pieces of baked potato under frozen conditions to maintain a flowable characteristic;
   wherein the Total Strecker Aldehydes of the baked potato is within the range of from about 2000 to about 10,000 nanograms (ng), and the Total Pyrazines is within the range of from about 1000 to about 10,000 ng.

4. A process according to claim 3 wherein the skin of baked potato is fractured prior to rehydration.

5. A process according to claim 1 wherein the wherein the Total Strecker Aldehydes is within the range of from about 2000 to about 10,000 nanograms (ng), and the Total Pyrazines is within the range of from about 1000 to about 10,000 ng.

6. A process according to claim 3 wherein the texture of the pulp exhibits an average pulp rigidity of from about 85 to about 105 grams load and an average mean load of from about 75 to about 110 grams, and the texture of the peel exhibits an average peak load prior to hydration of from about 800 to about 1500 grams.

7. A process according to claim 3, wherein the peel of the baked potato exhibits an average work done to hardness without rehydration of from 2700 to 5600 grams.

8. A process according to claim 3, wherein, following rehydration, the peel exhibits an average work done to hardness of from 1600 to 2600 grams and after hydration of from about 500 to about 750 grams.

9. A process for preparing a baked potato product which retain baked potato flavor and aroma during frozen storage and comprises discrete pieces of frozen baked potato including the skin, wherein potato skin is attached to baked potato pulp, the process comprising:
   baking a potato at a temperature of from 300° to 450° F. for a time of from 45 minutes to about 90 minutes to produce a baked potato having a moisture content within the range of from 70 to 75% and an Iodine Index within the range of from about 0.2 to about 0.4,
   fracturing the skin of the baked potato to enable uniform rapid hydration;
   rehydrating the baked potato by contacting with water to reduce toughness of the skin and to increase the moisture content of the potatoes by from 1 to 3% by weight, wherein the peel of the baked potato exhibits an average peak load without rehydration of from 800 to 1500 grams and from 500 to 700 grams following hydration,
   following rehydration and prior to subdividing, the baked potatoes are pressed to uniformly reduce their thickness to from ¼ inch to 1½ inches,
   freezing the baked potato following rehydration,
   subdividing the baked potato into discrete pieces of a size of from about 0.5 to about 1.5 inches without mashing the pulp and wherein potato skin is attached to baked potato pulp, and packaging the discrete pieces of baked potato under frozen conditions to maintain a flowable characteristic;

wherein the Total Strecker Aldehydes is within the range of from about 2000 to about 10,000 nanograms (ng), and the Total Pyrazines is within the range of from about 1000 to about 10,000 ng;

the texture of the pulp exhibits an average pulp rigidity of from about 85 to about 105 grams load and an average mean load of from about 75 to about 110 grams; and a majority of potato skin in the product is attached to baked potato pulp.

\* \* \* \* \*